United States Patent [19]

Kushler et al.

[11] Patent Number: 5,297,041
[45] Date of Patent: Mar. 22, 1994

[54] PREDICTIVE SCANNING INPUT SYSTEM FOR RAPID SELECTION OF AUDITORY AND VISUAL INDICATORS

[75] Inventors: Clifford Kushler, Wooster, Ohio; Bruce R. Baker, Pittsburgh, Pa.; David Hershberger, Millersburg, Ohio; Edward Gasser, Sterling, Ohio; Barry Romich, Wooster, Ohio

[73] Assignee: Semantic Compaction Systems, Pittsburgh, Pa.

[21] Appl. No.: 851,899

[22] Filed: Mar. 16, 1992

Related U.S. Application Data

[63] Continuation-in-part of Ser. No. 536,022, Jun. 11, 1990, Pat. No. 5,097,425.

[51] Int. Cl.$^5$ .................. G06F 15/21; G06F 3/023
[52] U.S. Cl. .................. 364/419.15; 364/709.12; 364/709.16; 341/28; 340/825.19; 434/112
[58] Field of Search .............. 364/419, 709.12, 709.15, 364/709.16; 434/112, 116; 381/51-53; 340/706, 711, 825.19; 341/21, 22, 26, 27, 28

[56] References Cited

U.S. PATENT DOCUMENTS

| | | | |
|---|---|---|---|
| 4,241,521 | 12/1980 | Dufresne | 434/112 |
| 4,438,505 | 3/1984 | Yanagiuchi et al. | 364/419 |
| 4,661,916 | 4/1987 | Baker et al. | 381/52 |
| 5,187,480 | 2/1993 | Thomas et al. | 341/28 |
| 5,210,689 | 5/1993 | Baker et al. | 364/419 |

OTHER PUBLICATIONS

"Enhancements to the Semantic Compaction Paradigm for Vocabulary Organization" by Clifford Kushler et al, RESNA 14th Annual Conference, Kansas City, Mo. 1991.
"Proposed Enhancements to the Semantic Compaction Paradigm for Vocabulary Organization" by Clifford A. Kushler, Ph.D., Prentke Romich Co., Wooster, Ohio.
"Words+ Talking Screen (tm) Main Menu Help".
"Words+ AudScan II (tm) Main Menu".
"Minspeak: An Introduction to the Concept", Prentke Romich Company.
Dynavox Manual, Version 1.0, 1991.
"Introducing System 2000" by Words +, inc., Fall 1991.

*Primary Examiner*—Roy N. Envall, Jr.
*Assistant Examiner*—Jennifer L. Hazard

[57] ABSTRACT

A predictive scanning input system provides predictive selection of individual indicators corresponding to keys on the keyboard to input a previously stored plural word message to a processor and subsequently to an output device. The predictive scanning input system of the present invention allows the user to select only a limited number of keys which can produce a previously stored message involving an initially detected symbol corresponding to a first key which has been operated. The system operates in conjunction with a keyboard containing a plurality of icons or polysemic (many-meaning) symbols to allow a user to access plural word messages or sentences previously stored in the memory thereof, for selective retrieval by the keyboard. The predictive scanning input system, in conjunction with the symbols containing these polysemic symbols or icons, can be adjusted to a user's needs to aid a user in communication through previously stored plural word messages, by actuation of only a limited number of keys further limited by activation of visual indicators of the predictive scanning input system corresponding to each of a plurality of symbol sequences containing an initially detected symbol. This thereby defines to a user a limited number of keys which can produce a stored message involving an initially detected symbol.

117 Claims, 19 Drawing Sheets

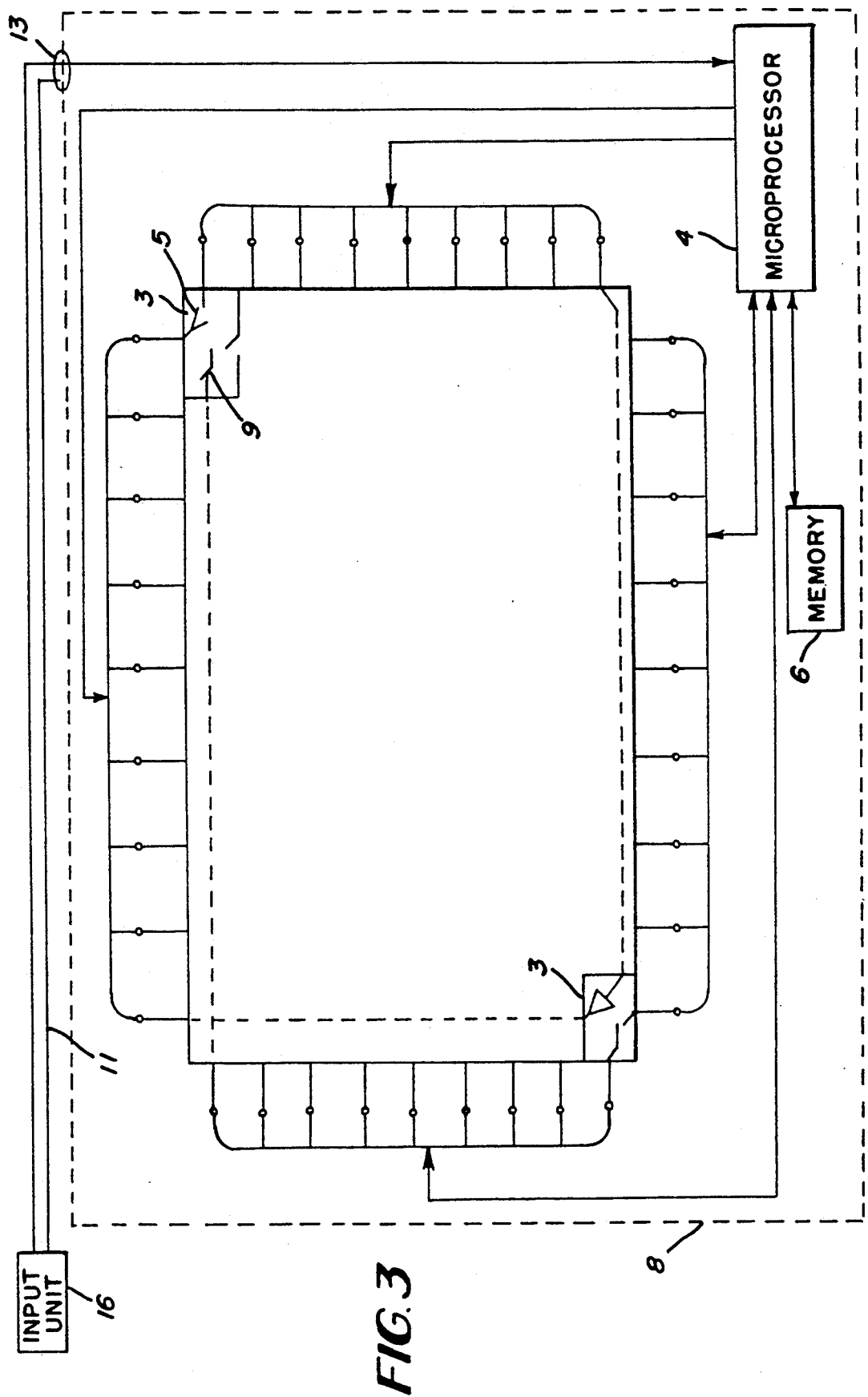

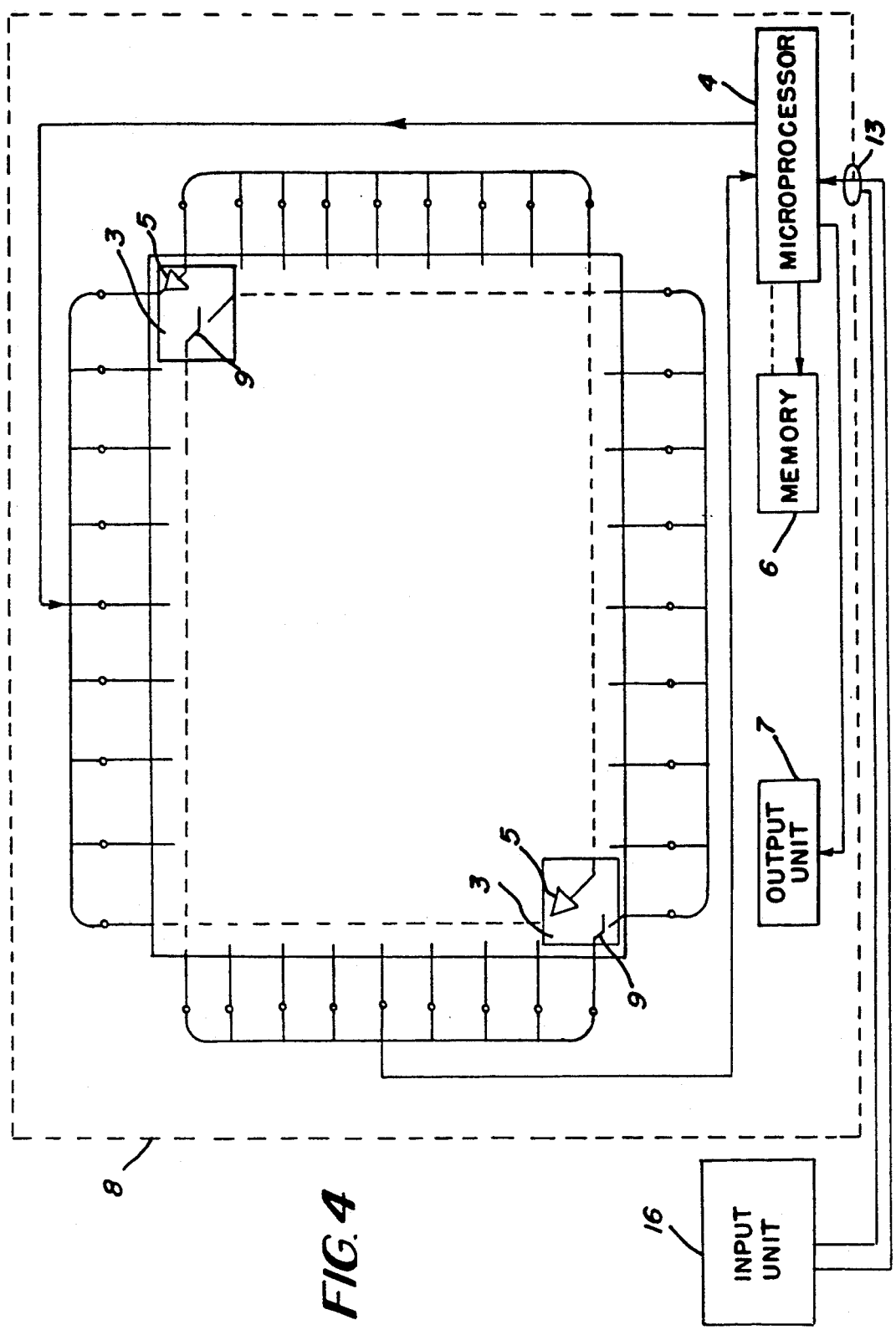

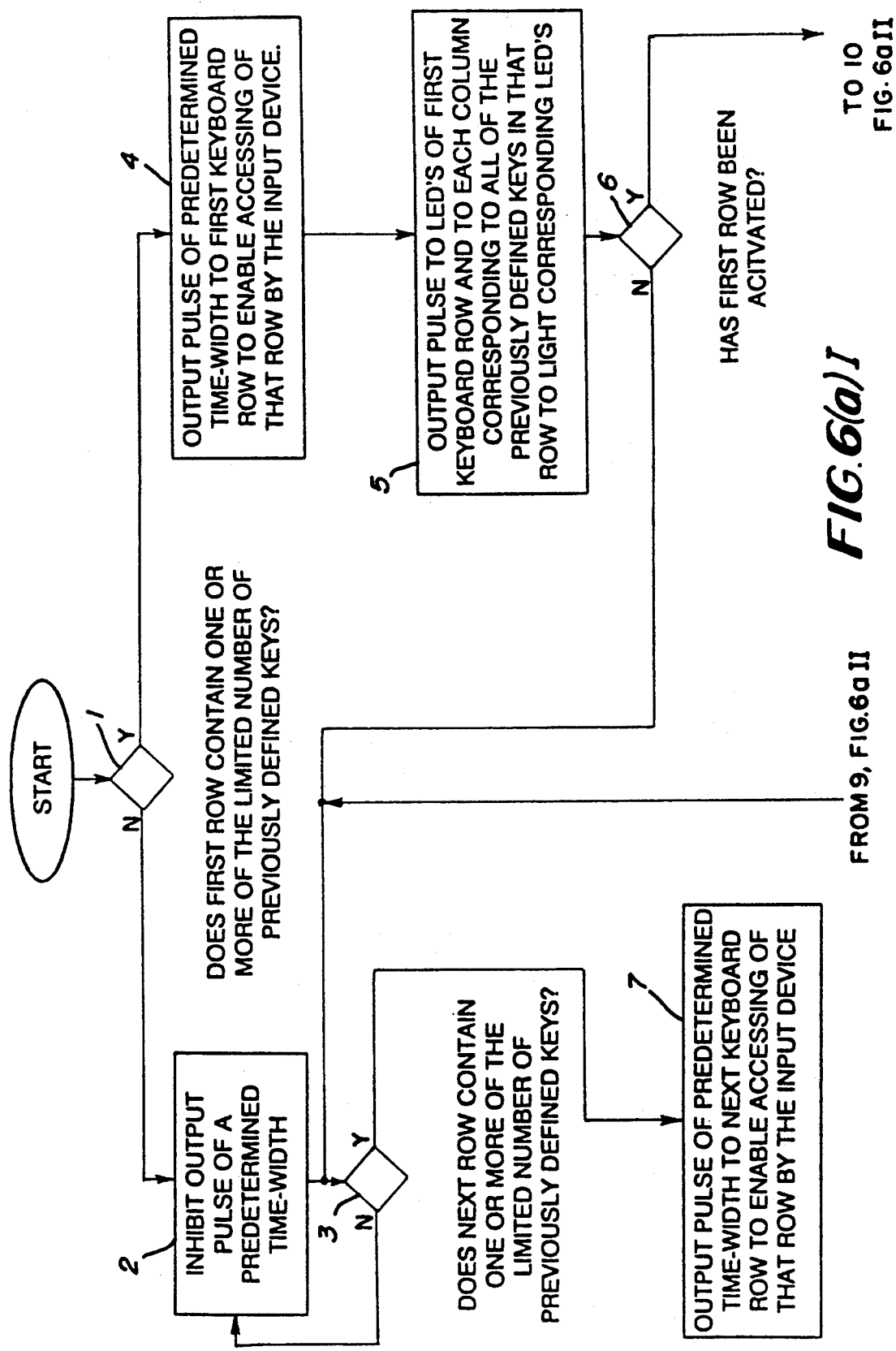
FIG. 6(a)I

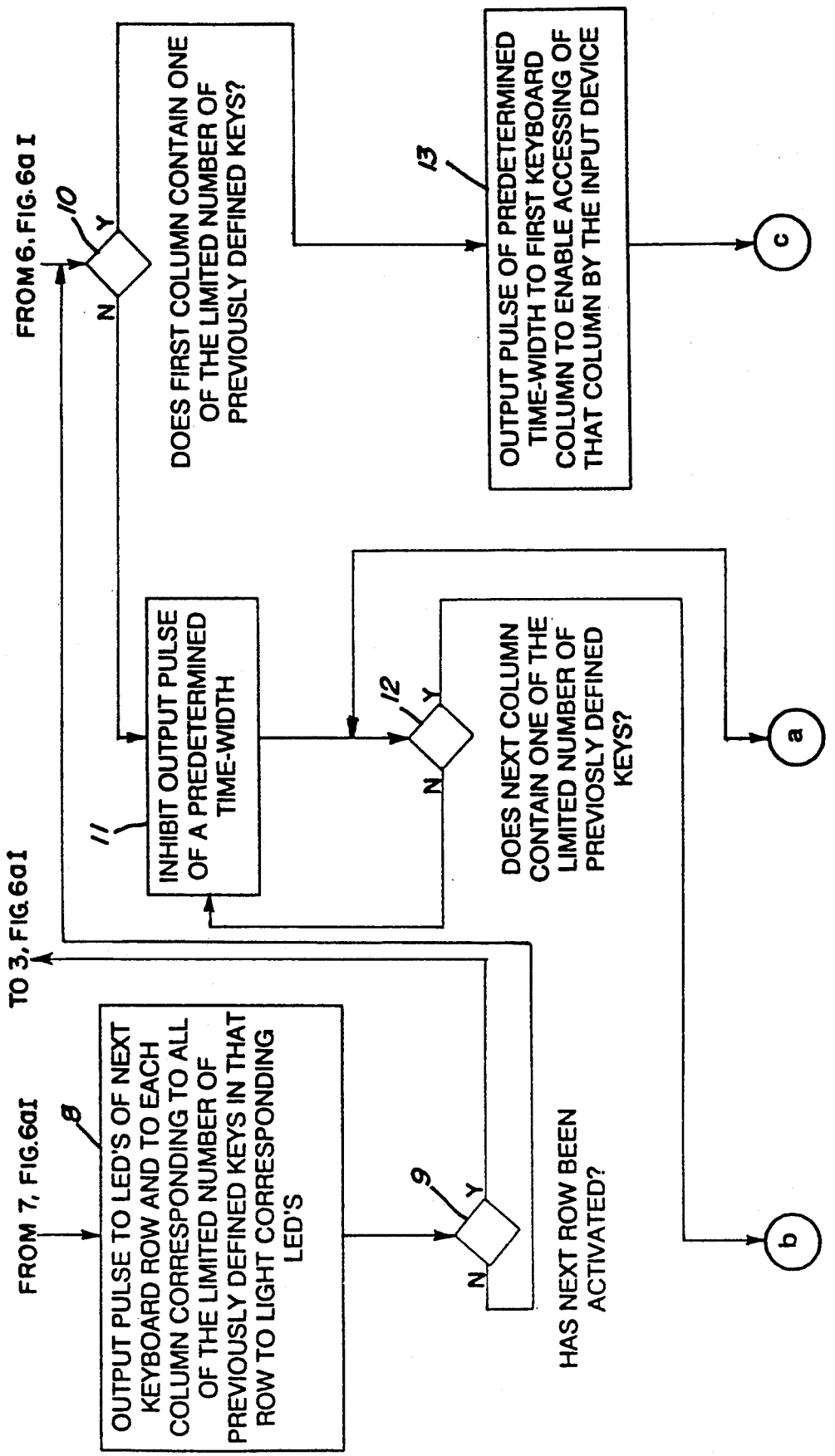
FIG. 6(a)11

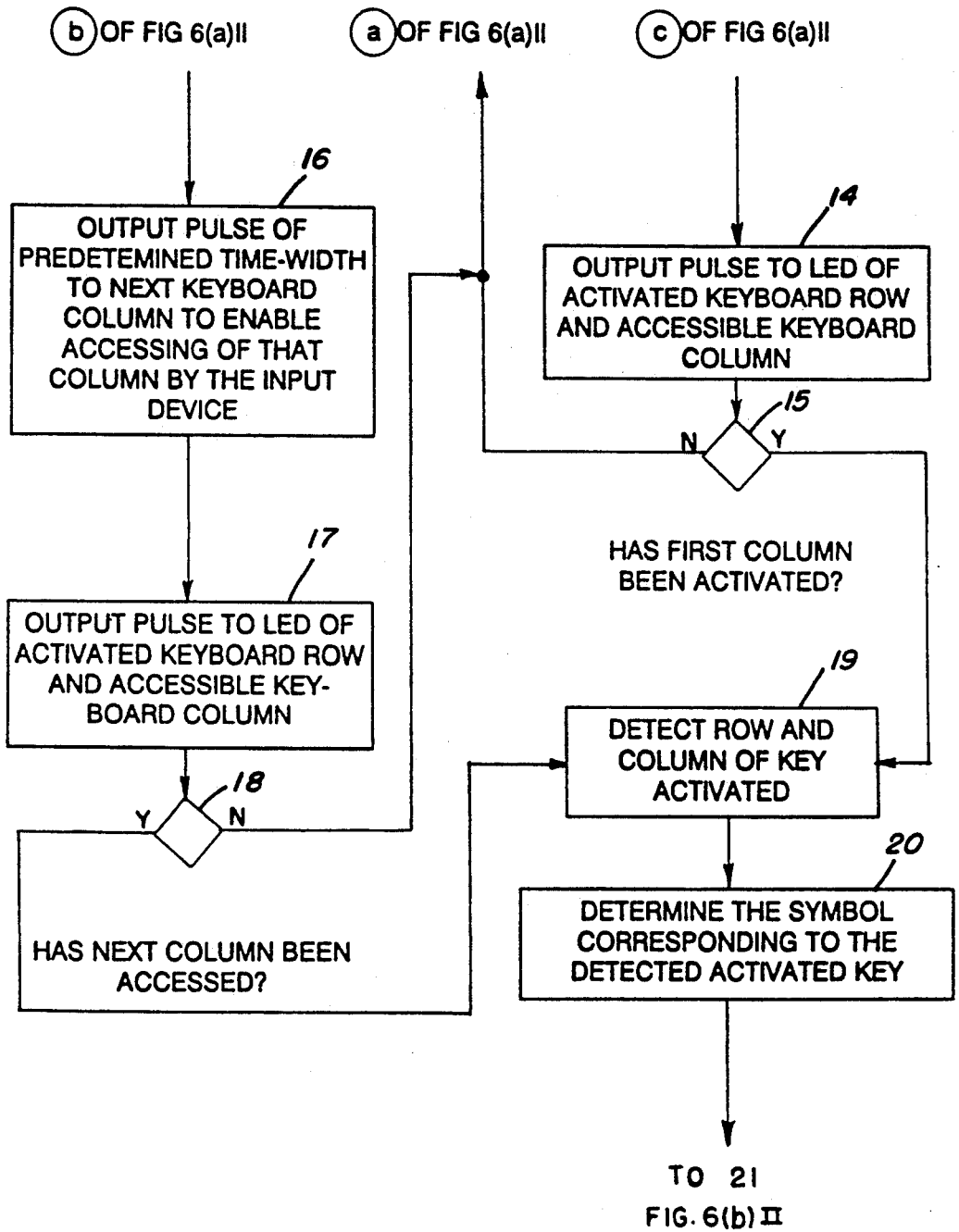
FIG. 6(b) I

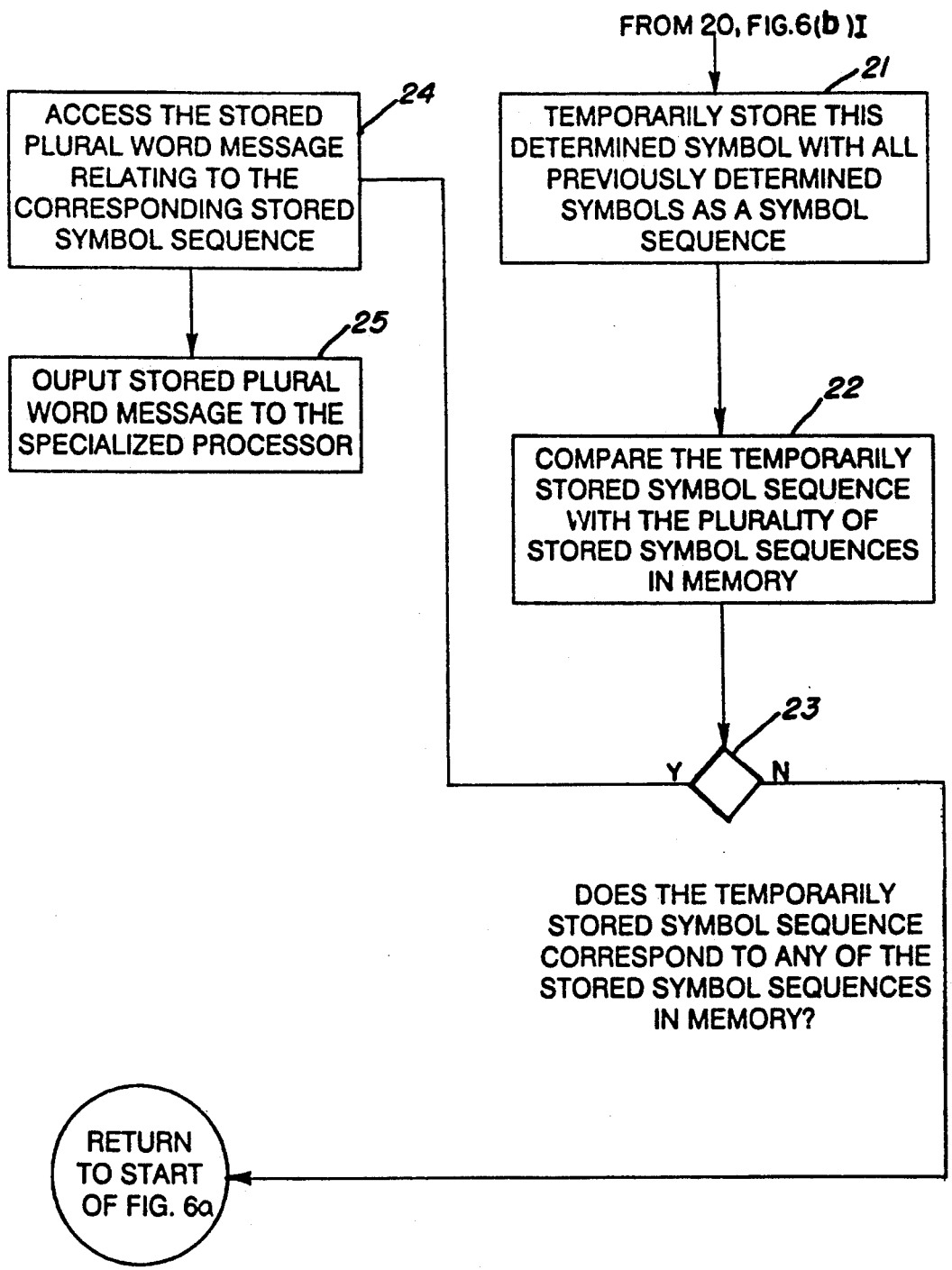
FIG. 6(b) II

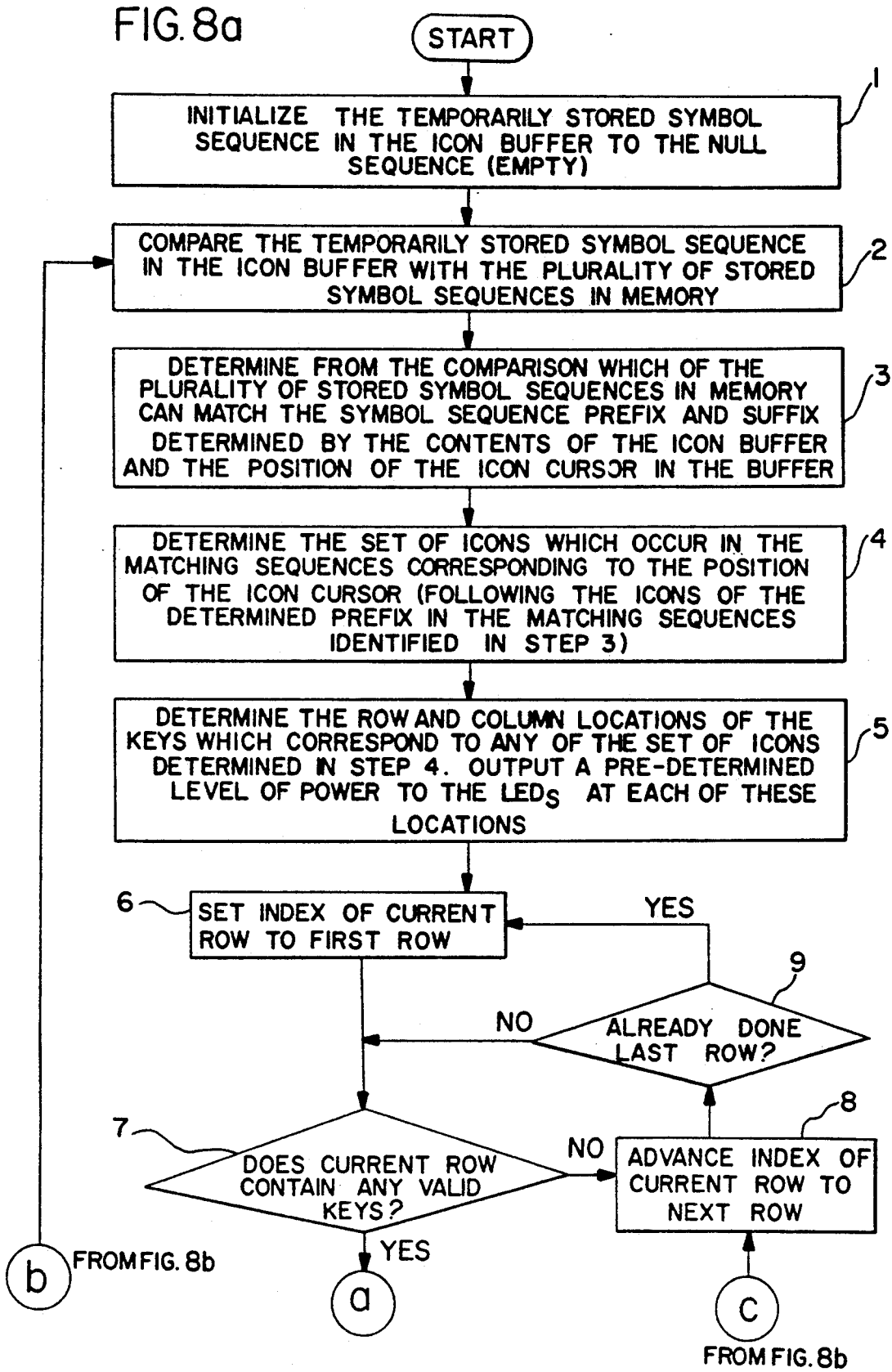

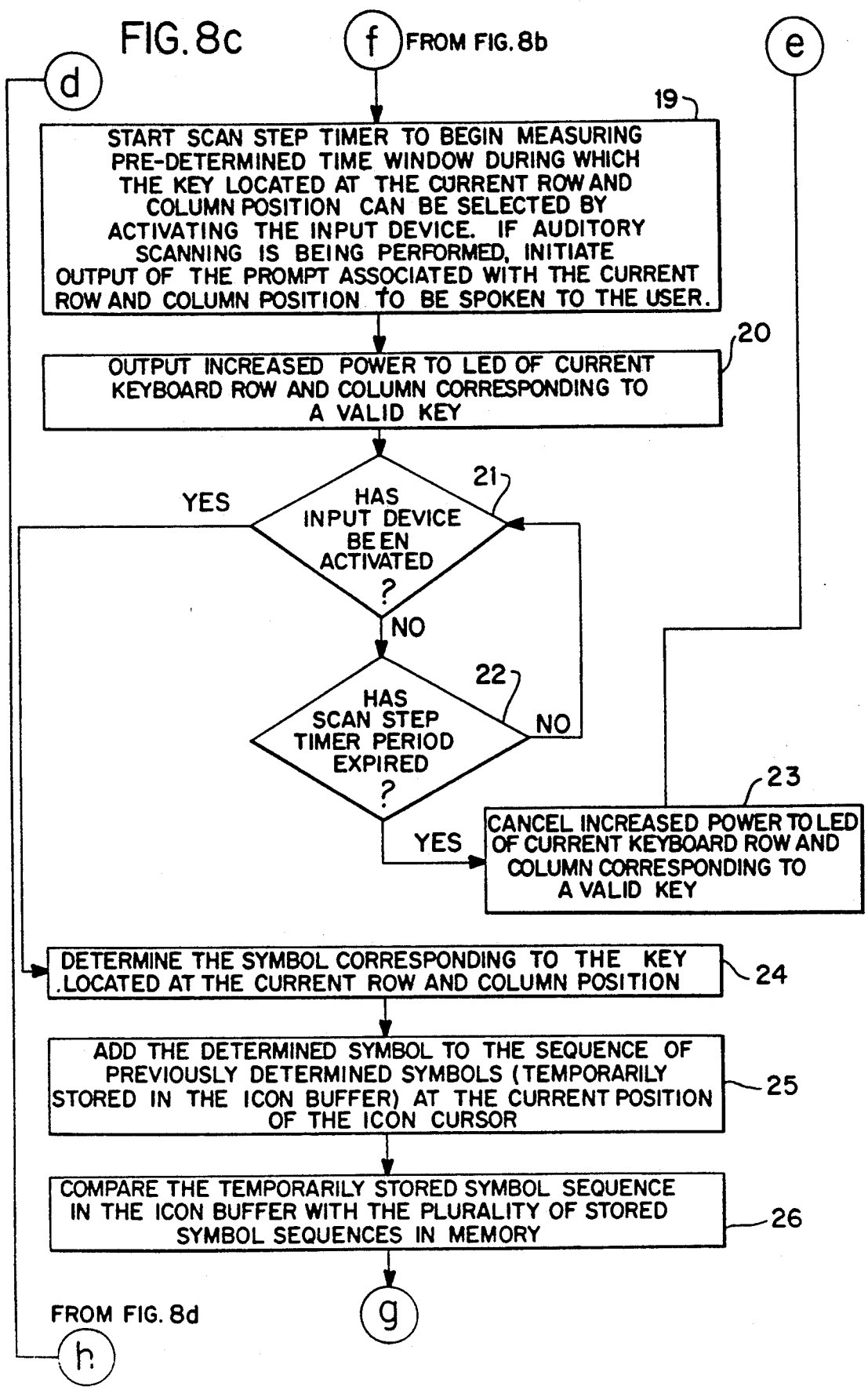

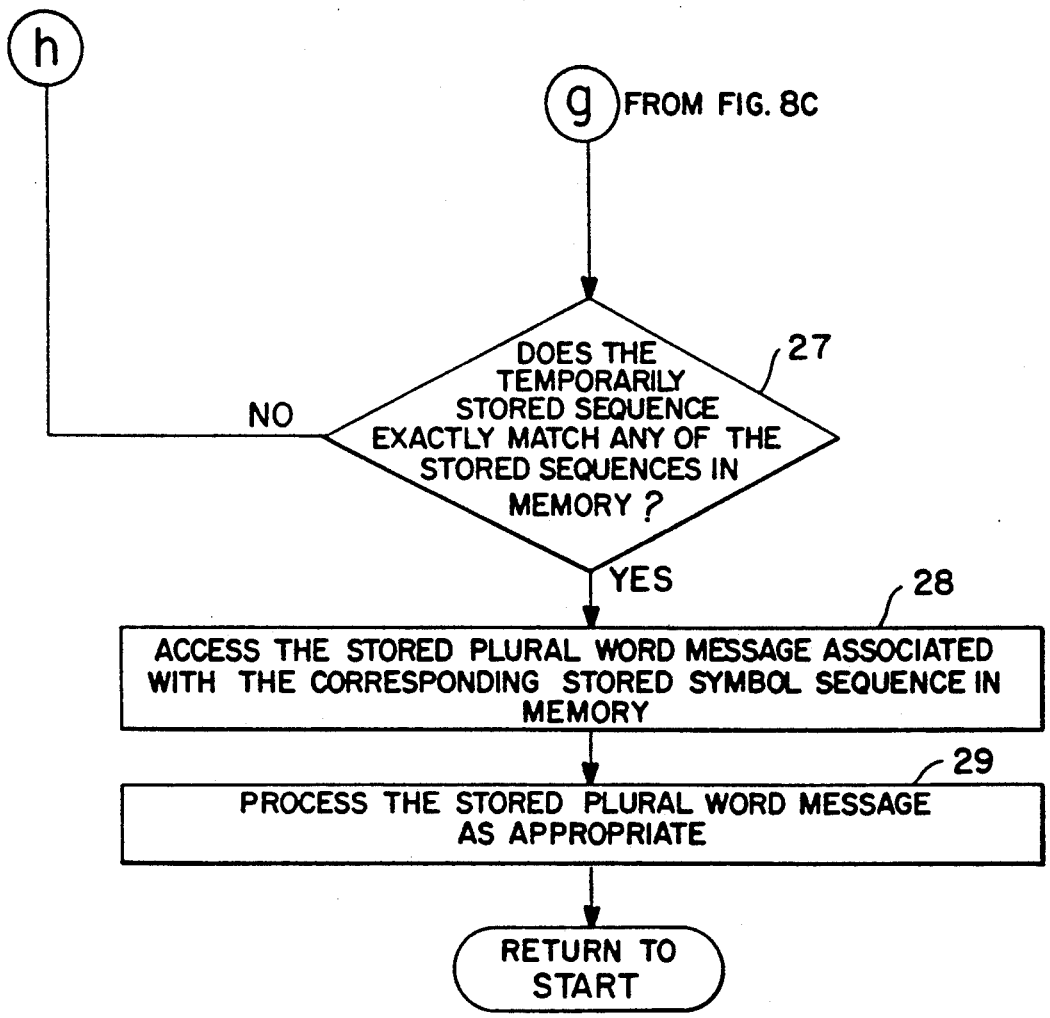

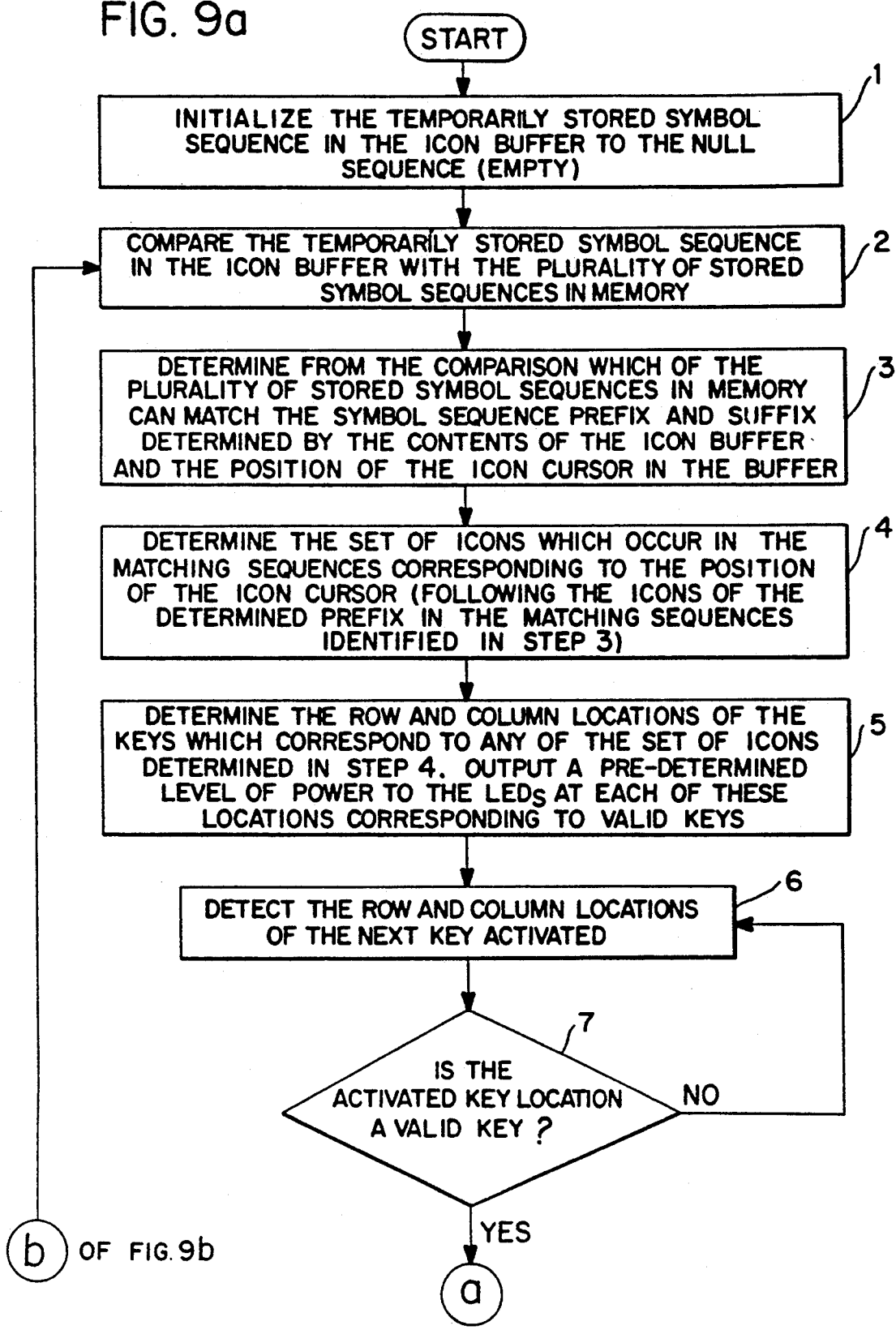

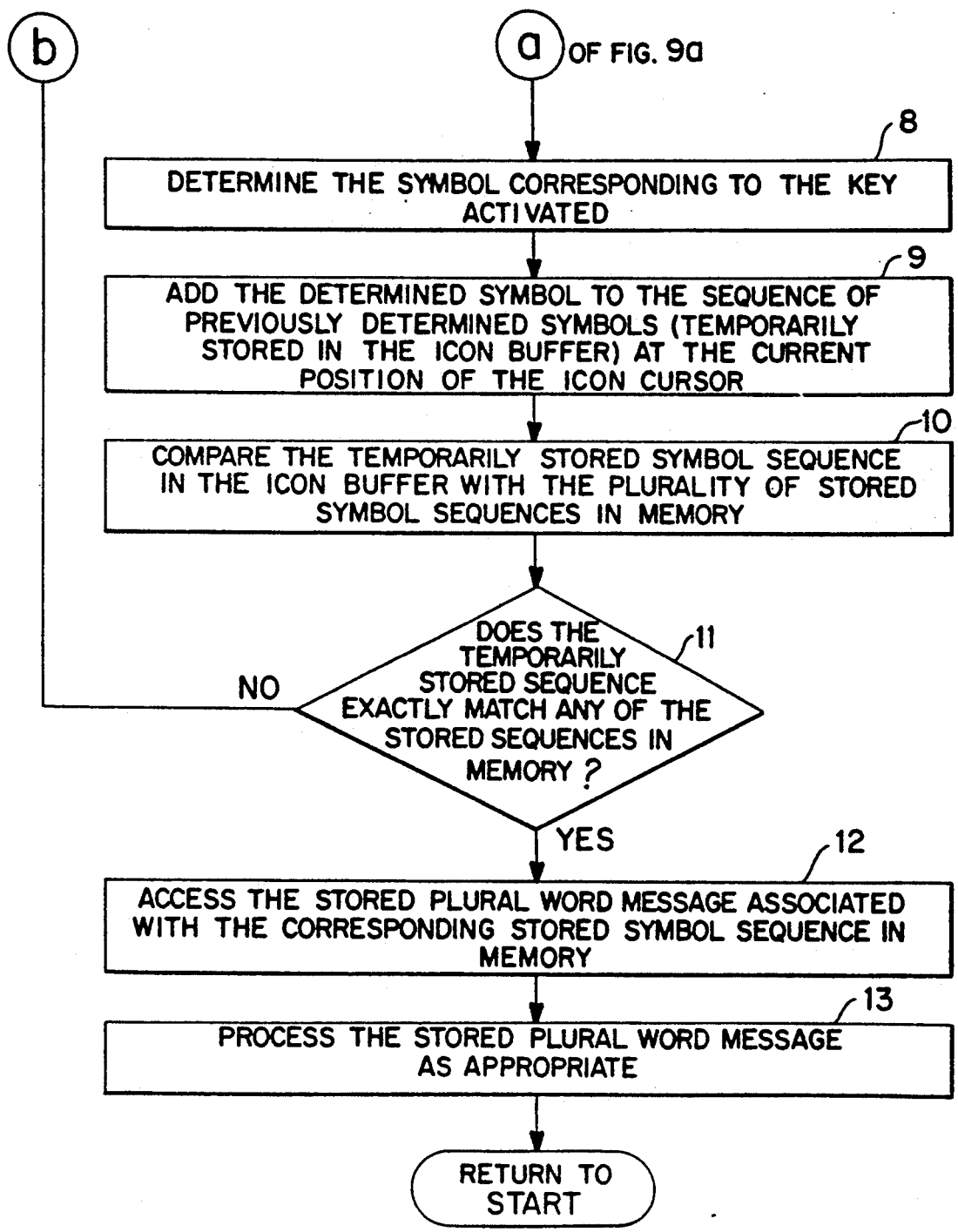

PREDICTIVE SCANNING INPUT SYSTEM FOR RAPID SELECTION OF AUDITORY AND VISUAL INDICATORS

CROSS-REFERENCE TO RELATED APPLICATIONS

This application is a continuation-in-part of application Ser. No. 07/536,022 filed on Jun. 11, 1990, now U.S. Pat. No. 5,097,425, the entire contents of which are hereby incorporated by reference.

BACKGROUND OF THE INVENTION

The present invention relates to a predictive scanning input system for rapid selection of visual and auditory indicators corresponding to keys on the keyboard, each key corresponding to one of a plurality of symbols. The predictive scanning relates to an input system to be utilized to input information to later be synthesized to produce audible or recorded data. In one preferred embodiment, the system relates to an input system for a linguistic coding system for use by people unable to use their own voices to create either a synthesized speech or synthetic printed messages. The input system is directed toward a system upon which, upon activation of the system upon activation of a first key, a plurality of visual or audible indicators are activated on certain of the remaining keys when they are found to correspond to symbols of a plurality of symbol sequences which may subsequently be formed. Thus, it thereby defines a limited number of keys which can produce a stored message involving that initial input key or a plurality of symbols which begin symbol sequences which can produce a stored message. Therefore, the input message can then be utilized to create synthetic speech or be output to a printing device.

Previously, a system and method for producing synthetic plural word messages was developed by Bruce Baker et al and is disclosed in U.S. Pat. No. 4,661,916 to Baker et al and issued on Apr. 28, 1987, the disclosure of which is incorporated herein by reference. The system is directed to a linguistic coding system and keyboard for the use by people unable to use their own voices. The coding system and associated keyboard may be used to store and access sentences, phrases, phonemes, letters, functions, or any combination thereof. Hereinafter, the generic term "plural word messages" will be used to denote any such stored and accessed entity.

In such a system, the keyboard is coupled to a computer which stores a plurality of plural word messages or sentences in the memory thereof for selective retrieval by the keyboard. The sentences retrieved from the keyboard are fed to a voice synthesizer which converts them through a loudspeaker to produce audible spoken messages. The keyboard utilizes polysemic (many-meaning) symbols, also known as icons, corresponding to respective keys. By designating selected ones of the keys and their associated symbols, selected recorded plural messages may be accessed from the memory.

With the system described in U.S. Pat. No. 4,661,916, however, plural word messages in the memory could be retrieved from memory by actuating a combination of designated primary message theme keys and other keys to vary the context of the polysemic symbols. Thus, a plurality of sentences could be selectively generated as a function of polysemic symbols in combination with other symbols. However, if a scanning system is utilized to activate the plurality of keys on the keyboard, it can take an extremely long amount of time to activate each of the switches corresponding to a sequence of symbols needed to access a particular message.

Row-column scanning systems have previously been developed to sequentially access rows and columns of a keyboard. In row-column scanning, each row lights up in succession. When the row is illuminated which contains the key which a user desires to select, a switch is hit. After the user has hit the switch, then each key in succession from left to right in that row lights up. When a desired key is illuminated, the switch is hit again. Thus, each key selection requires two actuations. The first actuation determines the row and the second actuation determines the column. Row-column scanning is usually very slow. The more keys a user must scan through, the longer it takes.

SUMMARY OF THE INVENTION

The present invention was designed to improve the row-column scanning system utilizing various input devices and to further create an improved input system utilizing a predictive-scanning method.

More specifically, the system of the present invention was designed for use by people with diseases such as ALS, for example, commonly known as Lou Gehrig's disease. It is usually fatal, but some people live with Lou Gehrig's disease for decades. Almost everybody who has the disease loses the ability to speak or use handsigns within the first two years. These people need a scanning system which is easy to operate and efficient.

According to each of the embodiments of the present invention, it is an object of the present invention to provide a predictive scanning system and method which can be utilized in conjunction with an input device to provide a quick and efficient input system easy for a user to utilize.

It is another object of the present invention, in these preferred embodiments, to create a predictive scanning system and method which define and activate only a limited number of keys which can produce a stored message involving an initially detected symbol and involving select symbols prior to initial symbol detection.

It is a further object in this preferred embodiments of the present invention, to provide a predictive scanning input system and method for predictive selection of individual indicators corresponding to keys on the keyboard, to input symbols to a voice synthesis system, to thereby audibly produce a stored message.

It is a further object in these preferred embodiments to utilize the predictive input system and method of the present invention in a language translation system.

It is a still further object, in at least one of these preferred embodiments of the present invention, to symbol or icon or upon the system being turned on prior to any key being activated, can indicate to a user which of a plurality of a limited number of additional icons may be accessed to produce a stored message.

It is a further object of the invention in at least one of these preferred embodiments to utilize this predictive scanning system and method to output an accessed plural word message to a voice synthesis system or language translation system.

It is yet another object of the present invention in at least one of the preferred embodiments, to define a limited number of keys which may be accessed upon detecting that a first key has been activated to provide a user with a system and method which quickly and efficiently define a limited number of keys which can produce a stored message involving an initially detected icon on an initially activated key.

It is yet a further object of the present invention in at least one of the preferred embodiments, to define a limited number of keys which may be accessed upon detecting that the system has been turned on (prior to any key activation), to provide a user with a system which quickly and efficiently defines a limited number of keys, corresponding to initial symbols in a plurality of prestored symbol sequences, which can produce a stored message.

It is a still further object of the present invention in each of the preferred embodiments, to provide a predictive scanning input system and method for predictive selection of individual indicators corresponding to keys on the keyboard, where the indicators are audible indicators, visual indicators, or both audible and visual indicators.

It is still a further object of the present invention in at least one of the preferred embodiments, to define a limited number of keys which may be activated upon detecting no keys or a first key corresponding to a beginning or a second symbol, respectively, of a stored symbol sequence (forward prediction) or corresponding to an end or second from an end symbol, respectively, of a stored symbol sequence (backward prediction).

It is a still further objection of the present invention in any of the first four embodiments to define a limited number of keys which may be activated upon detecting that a plurality of keys have been activated corresponding to a stored plural word message which accesses a plurality of symbol sequences (with a "blank" inserted) to invoke icon prediction automatically to simplify the retrieval of stored plural word messages to fill in each "blank" and subsequently allow for output of a complete message.

The objects of the present invention are fulfilled by providing a predictive scanning input system for predictive selection of indicators corresponding to keys on a keyboard, each key corresponding to one of a plurality of symbols, comprising: detecting means for detecting activation of a first of a plurality of keys on said keyboard and for detecting the symbol corresponding to said activated key; memory means for storing a plurality of symbol sequences, each including a plurality of symbols, each symbol corresponding to one of a plurality of keys on the keyboard, said memory means further storing a message, one corresponding to each of said plurality of symbol sequences; comparison means, operatively connected to said detecting means and said memory means, for comparing a detected symbol to said plurality of symbol sequences stored in said memory means, to determine which of said plurality of symbol sequences begin with said detected symbol, which symbols of those symbol sequences beginning with the detected symbol immediately follow the detected symbol, and which of said plurality of keys correspond to each immediately following symbol; and indicator activation means, operatively connected to said comparison means, for activating an indicator for each of said plurality of keys determined to correspond to each of said immediately following symbols to thereby define a limited number of keys for subsequent activation in producing a stored message of a symbol sequence beginning with that detected symbol, wherein each indicator includes at least one of an audible and a visual indicator.

The objects are further fulfilled by providing a method of predictive input scanning for predictive selection of indicators corresponding to keys on a keyboard, each key corresponding to one of a plurality of symbols, comprising: (a) detecting activation of the system; (b) storing a plurality of symbol sequences, each including a plurality of symbols, each symbol corresponding to one of a plurality of keys on the keyboard, and further storing a message, one corresponding to each of said plurality of symbol sequences; (c) determining which symbols are symbols which begin at least one of the plurality of stored symbol sequences, upon detecting activation of the system, and determining which of the plurality of keys correspond to each of the symbols which begin at least one of the plurality of symbol sequences; (d) activating an indicator for each of the plurality of keys determined to correspond to each of the symbols which begin at least one of the plurality of symbol sequences to thereby define a limited number of keys for subsequent activation; (e) detecting activation of one of the defined limited number of keys and detecting the symbol corresponding to the activated key; (f) comparing the detected symbol to the plurality of stored symbol sequences to determine which of the plurality of symbol sequences begin with the detected symbol, which symbols are symbols immediately following the detected symbol in symbol sequences beginning with the detected symbol, and which of the plurality of keys correspond to each immediately following symbol; (g) activating an indicator for each of the plurality of keys determined to correspond to each of the immediately following symbols to thereby define a limited number of keys for subsequent activation; (h) detecting subsequent activation of one of the defined limited number of keys and detecting the symbol corresponding to the subsequently activated key; (i) comparing the detected symbol to the plurality of symbol sequences sequentially containing previously detected symbols, to determine which of the plurality of symbol sequences contain the detected symbol as a next symbol, which symbols of those symbol sequences containing the detected symbol as a next symbol immediately follow the detected symbol, and which of the plurality of keys correspond to each immediately following symbol; (j) activating an indicator for each of the plurality of keys determined to correspond to each of the immediately following symbols to thereby define a limited number of keys for subsequent activation; (k) repeating steps (h)–(j), until an immediately following symbol cannot be determined in step (i), thereby determining that the most recently detected symbol ends a symbol sequence; and (l) outputting a stored message corresponding to the symbol sequence which contains the most recently detected symbol as an end symbol, wherein at least one of an audible and a visual indicator is activated.

The objects are still further fulfilled by a method of predictive input scanning for predictive selection of indicators corresponding to keys on a keyboard, each key corresponding to one of a plurality of symbols, comprising: (a) detecting activation of the system; (b) storing a plurality of symbol sequences, each including a plurality of symbols, each symbol corresponding to one of a plurality of keys on the keyboard, and further storing a message, one corresponding to each of said plurality of symbol sequences; (c) determining which symbols are symbols which end at least one of the plurality of stored symbol sequences, upon detecting activation of the system, and for determining which of the plurality of keys correspond to each of the symbols which end at least one of the plurality of symbol sequences; and (d) activating an indicator for each of the plurality of keys determined to correspond to each of said symbols which end at least one of the plurality of symbol sequences to thereby define a limited number of keys for subsequent activation; (e) detecting activation of one of the defined limited number of keys and detecting the symbol corresponding to the activated key; (f) comparing the detected symbol to the plurality of stored symbol sequences to determine which of the plurality of symbol sequences end with the detected symbol, which symbols are symbols immediately preceding the detected symbol in symbol sequences ending with the detected symbol, and which of the plurality of keys correspond to each immediately preceding symbol; (g) activating an indicator for each of the plurality of keys determined to correspond to each of the immediately preceding symbols to thereby define a limited number of keys for subsequent activation; (h) detecting subsequent activation of one of the defined limited number of keys and detecting the symbol corresponding to the subsequently activated key; (i) comparing the detected symbol to the plurality of symbol sequences sequentially containing previously detected symbols, to determine which of the plurality of symbol sequences contain the detected symbol as a next preceding symbol, which symbols of those symbol sequences containing the detected symbol as a next preceding symbol immediately precedes the detected symbol, and which of the plurality of keys correspond to each immediately preceding symbol; (j) activating an indicator for each of the plurality of keys determined to correspond to each of the immediately preceding symbols to thereby define a limited number of keys for subsequent activation; (k) repeating steps (h)–(j), until an immediately preceding symbol cannot be determined in step (i), thereby determining that the most recently detected symbol begins a symbol sequence; and (l) outputting a stored message corresponding to the symbol sequence which contains the most recently detected symbol as a beginning symbol.

The objects are yet still further fulfilled by providing a determination means which, upon accessing the corresponding prestored message, determines which symbols are symbols which begin at least one of a plurality of prestored symbol sequences corresponding to the accessed prestored message, and determines which of the plurality of keys correspond to each of the symbols which begin at least one of the plurality of prestored symbol sequences corresponding to the accessed prestored message, and an indicator activation means which activates an indicator for each of the plurality of keys determined to correspond to each of the symbols which begin at least one of the symbol sequences corresponding to the accessed prestored message to thereby define a limited number of keys for subsequent activation.

The system of the previous invention in U.S. Pat. No. 4,661,916, as well as that of the present invention, allows for an operator to go directly from thought to speech. This is possible because each key on the keyboard bears a central image or symbol which is polysemic and illustrates an important aspect of life and/or linguistic function. The keyboards can be varied depending on the intellectual level of the intended operator. Therefore, each keyboard can in itself be a language which is designated for or with a specific user. Each of the polysemic symbols are developed to be rich in association and in combination signal sentence ideas in the operators memory. This enables the generation of plural word or whole sentence messages by the activation of only a limited number of keys. The device allows for a generation of at least one hundred sentences which can be easily retrieved from memory because of the ease which the polysemic symbols on the keys portray the production of whole thoughts.

Therefore, as can clearly be seen, the objects of the present invention are fulfilled by enhancing the input system of the previous linguistic coding system, including utilizing a keyboard with polysemic symbols or icons associated with each of the plurality of keys, by use of predictive scanning. By indicating to the user which of the plurality of polysemic symbols or icons, on only a limited number of keys, may be accessed after accessing an initial key or after activating of the system, the system and method of the present invention, can thus define a limited number of keys which can produce a stored message involving the initially detected symbol or involving symbols which begin or end a symbol sequence. Further, by utilizing a polysemic input keyboard in conjunction with the aforementioned row-column scanning of the keyboard, a more efficient, quicker, predictive scanning system can also be realized. Thus, such a system can be realized which defines a limited number of keys which may produce a stored message and can thus limit the number of rows and columns which need to be accessed.

These and further objects of the invention will become more readily apparent from the understanding of the preferred embodiments described below with reference to the following drawing figures.

BRIEF DESCRIPTION OF THE DRAWINGS

The present invention will become more fully understood from the detailed description given hereinbelow and the accompanying drawings which are given by way of illustration only and are not intended to limit the present invention, and wherein:

FIG. 3 illustrates the input system of a preferred embodiment of the present invention;

FIG. 4 illustrates a another preferred embodiment of the input system of the present invention;

FIGS. 6(a)I, 6(a)II, 6(b)I, and 6(b)II illustrate a flow chart further describing the operation of the preferred embodiment of the present invention, shown in FIG. 3;

FIGS. 9a and 9b illustrate a flow chart corresponding to a yet another preferred embodiment of direct selection icon prediction, shown in FIG. 4.

The above-mentioned drawings will be described in detail in the following description.

DETAILED DESCRIPTION OF THE PREFERRED EMBODIMENT

Figure 2:
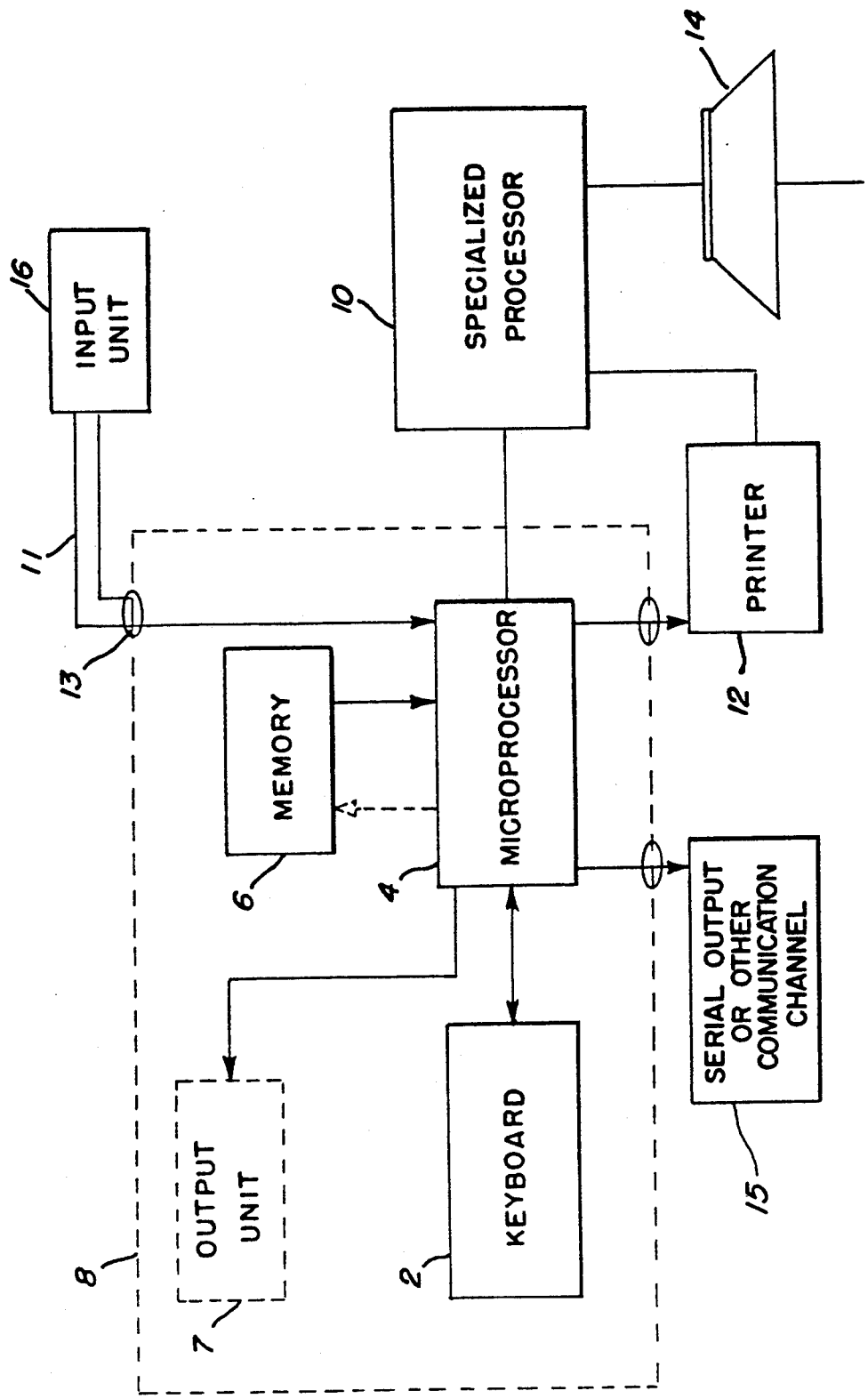
FIG. 2 illustrates the input system of a preferred embodiment of the present invention in conjunction with a specialized processing system and corresponding output units.

Referring to FIG. 2, there is illustrated the predictive input scanning system of the present invention, generally designated 8. The predictive input scanning system 8 is shown in conjunction with a specialized processor 10 and output units printer 12, communication channel 15, audio circuits 18 and 19 with speakers 14 and 21. Alternatively, circuit 19 and speaker 21 may be omitted, with all audio output routed through circuit 18 to speaker 14. The predictive input scanning system 8 generates input for the processor 10 based on accessing information corresponding to polysemic symbols of the to speaker 14. The predictive input scanning system 8 generates input for the processor 10 based on accessing information corresponding to polysemic symbols of the keyboard 2. Alternatively, the specialized processor 10 may be omitted, and the predictive input scanning system 8 may output processed information to printer 12 or communication channel 15. Any of all of the output channels of system 8 may be selected to output a given message.

The addition of auditory scanning capabilities to a system requires that the specialized processor 10 includes a microprocessor controlled speech synthesizer. The synthesizer should be a high quality synthesizer that is easily understood by the user. Anything less will make the system difficult to learn and use in other than optimal conditions. To maximize the effectiveness of the system, provisions need to be made in the hardware to allow the microprocessor 4 to route the audio signal output from the specialized processor 10 either to the user or the conversation partner. If both the system prompts and user generated speech are sent to the external speaker 14, the conversation partner will have system prompts intended for the user's access requirements. The exemplary implementation of auditory scanning is shown and described regarding FIG. 2a and uses an analog switch 17 to route the output from the speech synthesizer to either the standard audio output circuit 18 to speak to a listener through speaker 14, or to route the audio to the prompt audio output circuit 19 to inform the user of the present state of the system through an earphone or private speaker 21. An earphone detection circuit 20 is also included in this example. The system can detect if the earphone becomes disconnected and route the auditory scanning prompts to the main speaker if needed to keep the system functional.

Further, the predictive input scanning system 8 may include an output unit 7. This device 7 can be one of a processor and speaker to generate audible sound waves, light source matrix with individually controlled lights, or any similar type output device or combination of devices which can be utilized in conjunction with one of a plurality of different input devices 16. The input device 16 may be one or more of a plurality of input devices (which will be described subsequently) which is utilized in conjunction with the output device 7 and the microprocessor 4 to activate signals corresponding to the plurality of keys on the keyboard and thus indicate selection of a particular key. Further, this input device 16 can be connected to the microprocessor 4 through a cable 11 which is attached to an input port 13 of the system 8. Thus, a plurality of various input units 16 may be utilized to effect key selection and activation without depressing a key on the keyboard.

Figure 2A:
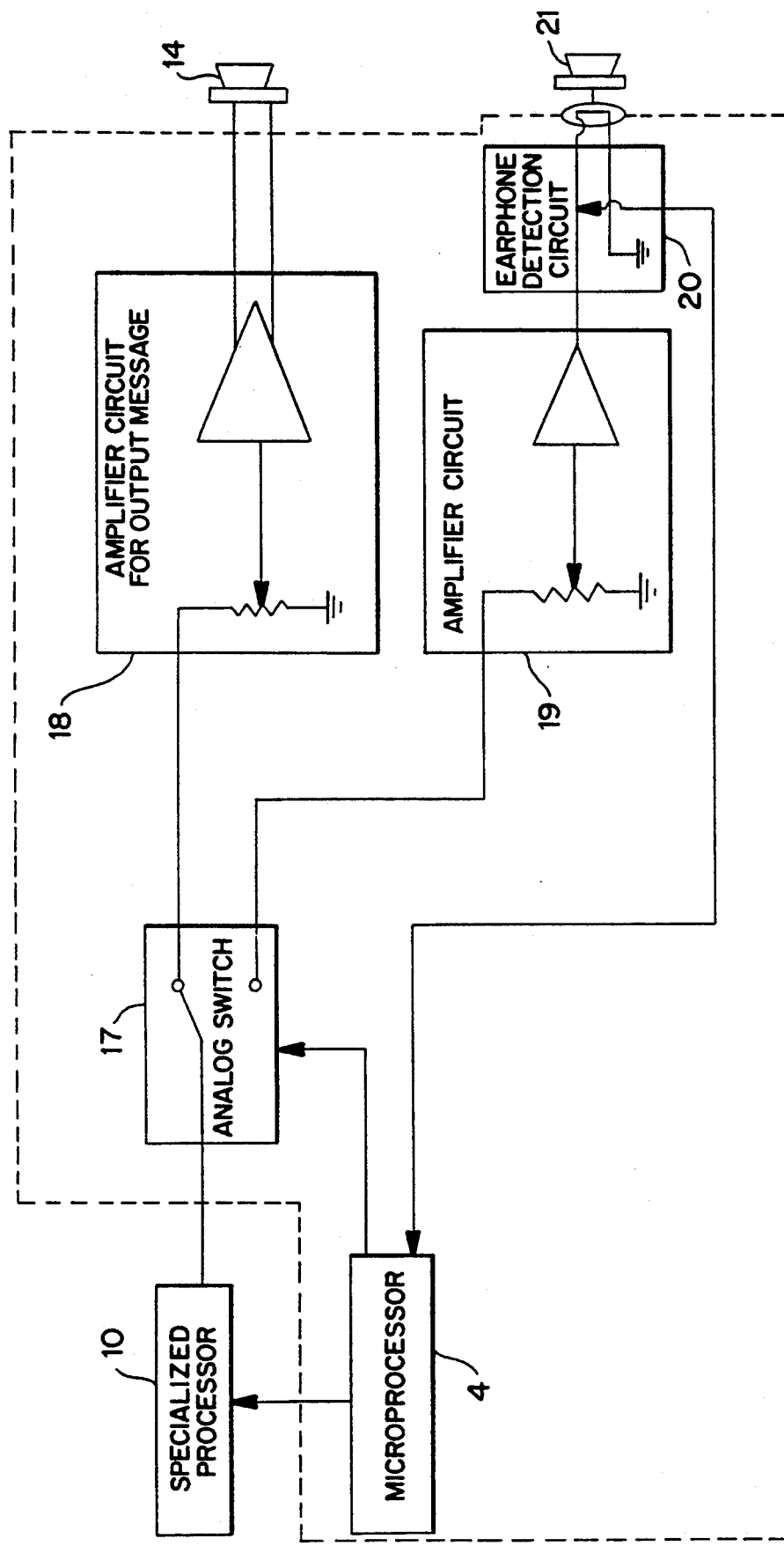
FIG. 2a illustrates the input system of FIG. 2 modified for an exemplary implementation with auditory scanning.

The processor 10 may be a language translator, a voice synthesizer or any other similar-type processor which may process plural word messages, accessed by the predictive input scanning system 8. Upon processing of the accessed plural word message, the message may then be output to an analog switch 17 under the control of microprocessor 4. This circuit can send the audio output signal of processor 10 to amplifier circuit 18 and then to speaker 14, as shown in FIG. 2a, to output an audible message corresponding to the accessed stored plural word message to communicate the accessed plural word message to another person. The specialized processor 10, may be one of a commercially available speech synthesizer such as the Votrax speech SPAC with the SC-01 voice synthesizer chip therein, marketed by Votrax or the commercially available DecTalk or SmoothTalker, for example. The output of the synthesizer, or a similar specialized processor, may be in turn coupled to a speaker 14 as described above to generate audible synthetic speech in a manner well known in the art. Microprocessor 4 may also use the analog switch 17 to route the audio output signal from microprocessor 10 to amplifier circuit 19 and then to a private listening speaker or earphone 21 used by the operator of system 8 to receive auditory feedback from the system (during auditory scanning, for example). If the earphone detection circuit 20 indicates that no external earphone or speaker is connected, or alternatively, if the entire audio circuit system of 19, 20 and 21 is omitted, this auditory feedback signal can be routed to amplifier 18 and speaker 14.

The actual predictive scanning input system 8 comprises mainly a keyboard 2, a microprocessor 4 and a memory 6 and optionally an output unit 7, depending on the particular input device utilized, as shown in FIG. 4, for example. Further, as shown with regard to FIGS. 3 and 4, the predictive scanning input system 8 can further include an input device 16. The main elements of the predictive scanning input system 8, as shown in FIG. 2, are components conjunctively utilized to detect the activation of a first of plurality of keys on the keyboard 2; storing a plurality of symbol sequences and a corresponding message for each in a memory 6; detecting when one of the plurality of keys has been activated which corresponds to one of a plurality of symbols stored in the memory, via a microprocessor 4; comparing the detected symbol on the initially activated key to the various symbol sequences in the memory 6 to determine which of the plurality of symbol sequences begin with the detected symbol; and for activating visual or audible indicators for each of the plurality of keys of the keyboard 2 which correspond to each of the plurality of symbols which follow the detected symbol in the symbol sequences containing the detected symbol as a first symbol, to thereby define a limited number of keys which can potentially produce a stored message.

Further, it should be noted that the aforementioned description regarding detection of activation of a first key; comparison of the symbol corresponding to the first activated key to a plurality of symbol sequences begin with the detected symbol; and activation of the indicators for each of the plurality of keys corresponding to each of the plurality of symbols which follow the detected symbol in the symbol sequences containing the detected symbol as a first symbol, is not to be construed as limiting. It will subsequently be described how, utilizing "backward prediction", each of the keys containing a symbol which is a final symbol in one of the stored symbol sequences can have its indicator activated upon the system being turned on or, for the second to last symbol, having indicators activated after activation of an initial key. Similarly, in "forward prediction", upon activation of the system (turned on), keys of symbols corresponding to initial symbols in stored symbol sequences can have indicators activated to begin icon prediction prior to activation of any key. Accordingly, the aforementioned description is merely exemplary, and, as discussed throughout the present application, should not be construed as limiting.

Figure 1:
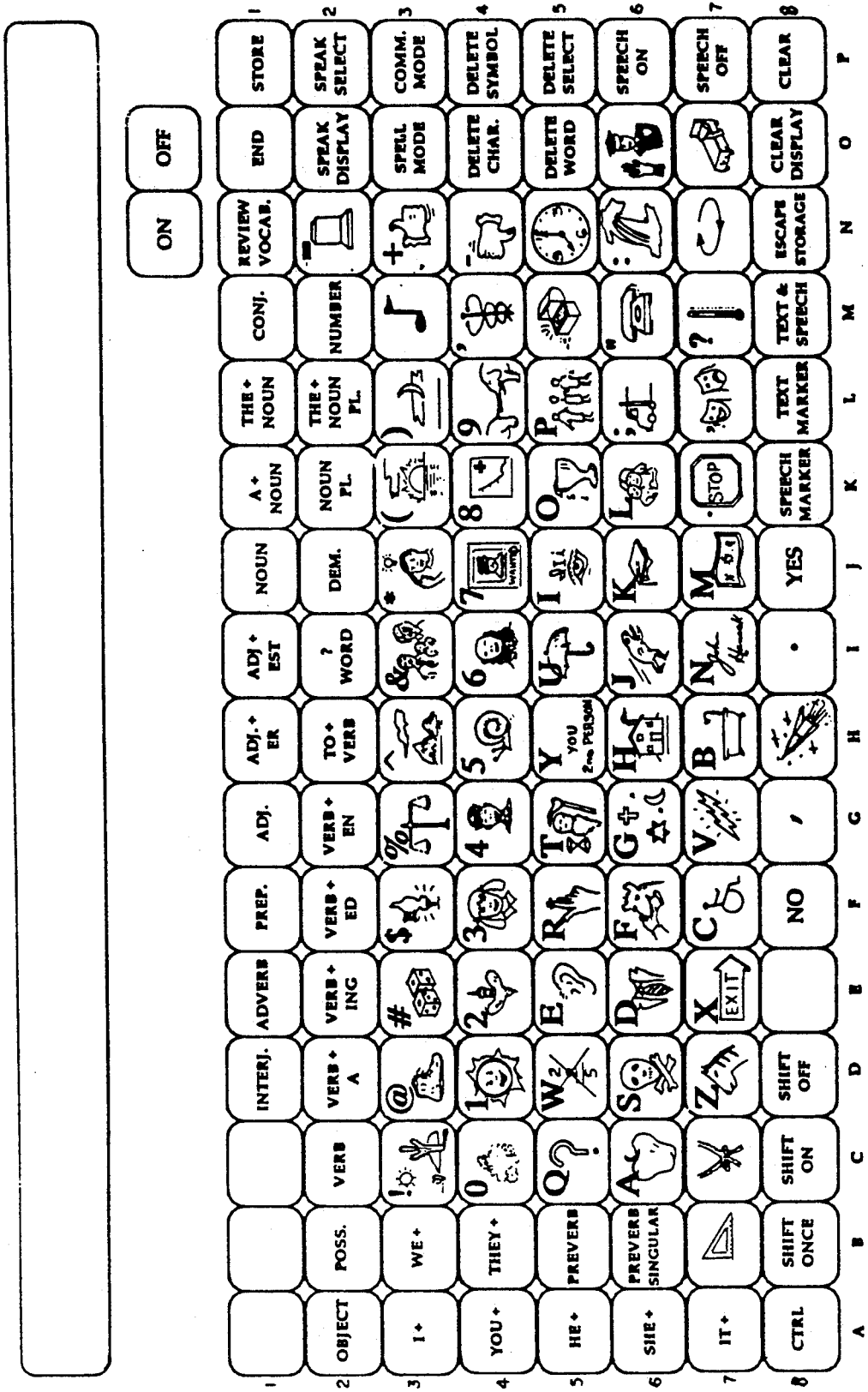
FIG. 1 illustrates a preferred embodiment of the input unit or keyboard of the present invention.

FIG. 3 illustrates a first preferred embodiment of the predictive scanning input system 8 of the present invention. In this preferred embodiment, the keyboard 2 is arranged such that keys 3 are formed in a plurality of rows and columns. Each of the plurality of keys contains a polysemic symbol or icon, or a part of speech or specific instruction or function, or a type of mode. Examples of the various keys on the keyboard are shown in FIG. 1. It is the keys with the polysemic symbols or icons which can be utilized to access each of the stored plural word messages in memory. Further, the parts of speech keys can also be utilized in conjunction with the icon keys to produce icon sequences pertaining to particular plural word messages stored in the memory 6. Two such examples of the keys on the keyboard are shown by 3 in FIG. 3.

Further, as can be seen with regard to FIG. 1, each of the plurality of keys on the keyboard further contains a visual indicator or light. These lights are shown by a dark circle in the lower left hand corner of each key, in FIG. 1. Each of the lights may be, for example, light emitting diodes (LEDs) 5 which emit a colored light indicating to a user a key which can be activated at that lights in the figures is merely illustrative and the positioning is not limited to that shown in the figures). This will be more clearly described subsequently with regard to the first embodiment of the present invention.

These LEDs 5 are activated by a microprocessor 4 sending a predetermined voltage to particular rows and columns corresponding to particular keys 3. Further, with regard to a first embodiment of the present invention, each of the plurality of rows and columns of LEDs 5 are sequentially activated, first by row and then by column. However, with the predictive scanning system of the present invention, in this first preferred embodiment, it is only the rows and columns of a limited number of keys 3, corresponding to those symbols which occur in one or more symbol sequences following the previously detected symbol or symbols to thereby define a limited number of keys which can produce or lead to the production of a stored message involving the detected symbol(s), which are activated during the sequential row-column type scan. If no symbols have yet been detected, or the previously detected symbol completed one of the stored sequences, then a limited number of keys are activated which correspond to those symbols which occur as the first symbol in one or more of the stored symbol sequences, i.e., symbols which begin a symbol sequence. This first embodiment of the present invention will be described subsequently in detail with regard to FIG. 5 and FIGS. 6a and b.

Alternatively, or an option which can function concomitantly with the system described above, the system operator may be provided with an auditory prompt or cue during the scanning of rows and columns. As each row is scanned which contains keys which can be activated which correspond to a symbol which can be selected to successfully produce or to lead to the production of a stored message, an auditory prompt is generated which informs the system operator as to which row is being scanned. This auditory prompt is predefined and is stored in memory 6 to be accessed by microprocessor 4. Since this is designated as an auditory prompt message, it will be generated by the specialized processor 10, while microprocessor 4 configures the analog switch 17 such that the audio output produced is routed to amplifier circuit 19 and thus to external speaker or earphone 21 (if no such circuit or speaker is available, this audio output may optionally be routed through amplifier circuit is and thus to speaker 14).

Similarly, once input device 16 has been activated to effect the selection of a row, scanning continues across those columns corresponding to a symbol which can be selected to successfully produce or to lead to the production of a stored message. As each such location is scanned, an auditory prompt is generated which informs the system operator as to which particular key location is being scanned. This procedure allows the system operator to use input device 16 and the generated auditory feedback to activate any key location corresponding to any symbol which can be selected to successfully produce or to lead to the production of a stored message, without scanning through locations corresponding to symbols which do not lead to the production of a stored message, and without needing to observe any visual display 7.

Alternatively, this auditory feedback may also be provided simultaneously with the corresponding illumination of visual display 7 to supplement and augment the feedback provided to the system operator during the scanning process. The particular row-column scanning technique described here is used as an illustrative example, and does not limit the present invention nor exclude its application to other similar scanning techniques (such as a column-row scan, quadrant scan, two-switch or three-switch scanning, directed joystick scanning or other scanning technique well known to someone of ordinary skill in the art). Hereinafter, the first embodiment will be described with respect to this particular row-column scanning technique, but it should be noted such auditory feedback could be generated in an appropriate manner to accompany any one of the scanning techniques discussed and contemplated previously and further by any other method as would be apparent to one of ordinary skill in the art, in such a fashion as to enable the user to select the desired keys through such scanning methods using only the auditory feedback thus provided, or if desired through a combination of such auditory and visual feedback as discussed above.

An input device is shown as 16 in FIG. 3. This input device can be, for example, a switch. The switch is then utilized in conjunction with microprocessor 4 and memory 6 to access certain keys on the keyboard, and to actuate certain light emitting diodes 5 corresponding to certain keys 3 on the keyboard.

The switch can be any kind which, when it is activated by the user, sends a signal through cable 11 and port 13 to the microprocessor, equivalent to key actuation. The switch may be one activated by the user's breath (a "puff switch"), by the user's tongue, by movement of the user's head, etc. Thus, the particular type of switch to be utilized as input unit 16 can be suited to a user's needs and ability.

The scanning system can operate in a row-column scanning type of operation, for example. Therefore, when a row is sequentially accessed by the microprocessor which contains a key which the user decides to select, a switch of the device 16 is activated. (Activation is dependent upon the switch utilized, for example, the user may activate the switch by a simple head movement.) The hitting of this switch sends a signal which is sent to microprocessor 4 through cable 13. Subsequently, after the user has activated the switch on the device 16, each of the various columns on the keyboard are then made accessible. When a desired key is made accessible to the user, the user again activates a switch on device 16. Similar to that which has been previously described, this signal generated by switch 16 is sent to microprocessor 4. Thus, each key selection by activation of the switch 16 requires both a row and column actuation to select a particular icon corresponding to a selected key. The first actuation determines the row and the second actuation determines the column. This row-column scanning system, in conjunction with the predictive scanning system of the present system, will be described subsequently with regard to FIG. 5 and FIGS. 6a and 6b and FIG. 8.

FIG. 4 illustrates a second preferred embodiment of the present invention. Similar to that of FIG. 3, in the second preferred embodiment a keyboard is utilized which contains a plurality of keys arranged in rows and columns. Further, each of these keys 3 contains both a visual indicator (LED) 5 and a switch 9. However, contrary to that of FIG. 3, activation of each of the keys on the keyboard is not achieved via activation of a single switch. In this embodiment, activation of each of the keys may be accomplished by a user merely depressing one of the keys with either his finger, a headstick or any other similar type device, depending on the user's abilities. Therefore, once a key is depressed, switch 9 is closed and the key is thus activated.

Upon activating a key, the microprocessor 4 then detects the particular row and column corresponding to that activated key. The microprocessor 4 then interacts with memory 6, in a manner to be described subsequently with regard to FIGS. 7 and 9 of the present invention. Further, the microprocessor 4 can then output voltages of a predetermined level to certain rows and columns of each of the keys, to light visual indicators corresponding to certain of the keys to which the voltage of a predetermined level has been supplied. Upon receiving this voltage of a predetermined level from the microprocessor 4, an LED 5 corresponding to key supplied with the voltage of a predetermined level, will then light up.

Alternately, or as an option which can function concomitantly with the system described above, the system operator may be provided with an auditory prompt or cue when directly activating individual keys. As a particular key is activated which corresponds to a symbol which can be selected to successfully produce or to lead to the production of a stored message, an auditory prompt is generated which informs the system operator as to the symbol associated with that key. This auditory prompt is pre-defined and is stored in memory 6 to be accessed by microprocessor 4.

Since this is designated as an auditory prompt message, it will be generated by the specialized processor 10, while microprocessor 4 configures to analog switch 17 such that the audio output produced is routed to amplifier circuit 19 and thus to external speaker or earphone 21 (if no such circuit or speaker is available, this audio output may optionally be routed through amplifier circuit 18 and thus to speaker 14). If the particular key which is activated does not correspond to a symbol which can be selected to successfully produce or to lead to the production of a stored message, the same auditory prompt may be generated to inform the system operator as to the symbol associated with that key will not successfully produce or to lead to the production of a stored message following the previously activated symbols.

Once a particular key is activated by closing the switch associated through direct physical contact, the associated auditory prompt will begin to be spoken through the private auditory feedback channel as described above, and will continue to be spoken as long as the key remains depressed. A timer will also be started to measure how much time has elapsed since the key was first depressed. If on hearing the associated auditory prompt, the user determines that this is the key which he wishes to activate, the activation can be effected by maintaining the key in a depressed stated beyond a predetermined time threshold.

Alternatively, the user may release the key and then depress it once again within the same time window as above to immediately effect the activation of that key at the time of the second depression (even though this occurs prior to the expiration of the time threshold required for activation by continuously holding the key down). As above in the case of auditory scanning methods, this auditory feedback may also be provided simultaneously with the corresponding illumination of visual display 7 (LEDs, for example) to supplement and augment the feedback provided to the system operator during the key selection and activation process. The particular method for direct activation of keys as described herein is used as an illustrative example, and does not limit the present invention nor exclude its application to other similar direct selection techniques (such as a proportional joystick, headpointing system or other selection technique well know to someone of ordinary skill in the art). Some examples of such techniques are briefly described below.

Any number of input devices 16 can be utilized in place of the above-mentioned headstick. These devices send signals from an input unit 16, through cable 11 to the microprocessor 4, for example, to simulate specific key activation. Further, some of these devices are utilized in conjunction with an output device 7 controlled by microprocessor 4. Some examples of such devices will subsequently be explained.

One type of input device 16 which may be utilized is the optical headpointer used with the "Light Talker". The "Light Talker" device contains a detection device which can be worn on a user's head. As the microprocessor 4 detects activation of a particular row and column corresponding to a key, and interacts with memory 6 (to be subsequently described with regard to FIGS. 7 and 9), the microprocessor 4 then lights certain LED's 5 on certain keys (it will be subsequently described how these certain keys are selected). The LED's for each of the selected keys are then sequentially pulsed (at a rate of approximately 30 times a second, for example) at a higher voltage than the keys are not thus selected. The user then turns his head to orient the optical headpointer toward the desired one of the selected keys which he wishes to activate. The detection device of the "Light Talker" then detects light from the pulsing LED's. A signal is sent from the optical headpointer of "Light Talker", through cable 11 and to microprocessor 4. The microprocessor 4 then determines, from the time of light detection by the detection device, toward which one of the keys the optical headpointer is pointed. As the key is determined by the microprocessor 4, the input device thus has achieved simulated specific key activation by maintaining the orientation of the headpointer toward this key past a predetermined time threshold (without the need for the user to physically depress any of the actual keys). It should be noted that this specific example is described regarding simulated key activation after a first key has been selected. However, when selecting a first key, the same process is utilized with each of the LED's being sequentially pulsed at the same voltage level.

A second example of an input device 16 which may be utilized as a simulated key activation is that of the "Headmaster" described in U.S. Pat. No. 4,682,159, which is incorporated herein by reference. The "Headmaster" is an ultrasonic device which sits on a user's head, similar to the "Light Talker", and contains a plurality of detectors. The device is connected to the microprocessor 4 by a cable 11, for example, through an input port 13. Similar to the description given regarding the above-mentioned "Light Talker", the "Headmaster" operation will subsequently be described corresponding to the microprocessor 4 initially having detected the row and column of a first key. The simulated activation of this first key, it should be noted, can occur through operation of the headmaster in a similar manner as will now be described in relation to simulated activation of a subsequent key.

Upon the microprocessor 4 detecting activation of a particular row and column corresponding to a first key, and interacting with memory 6 (to be subsequently described in FIGS. 7 and 9), the microprocessor then sends a signal to output device 7. Further, similar to that described previously regarding the "Light Talker", LED's corresponding to certain selected keys will be lit by the microprocessor 4. In the case of the "Headmaster", the output device outputs a sound wave or audible signal. However, the present invention is not limited to such an audible output device. One of ordinary skill would realize that any output device could be utilized such as that of an infrared light emitter (or similar light or sound output device), in conjunction with a corresponding detector on the input device 16, such as an infrared detector (or similar light or sound received device). Further, the present invention is not limited to visual indicators being lit as corresponding to certain selected keys. Other indicators, such as audible indicators, can be used either separately or in conjunction with the visual indicators.

The headpiece of the "headmaster" contains a plurality of detectors, for example, three, which can detect the angle of the headpiece with respect to the output signal wave, so that the user can orient the headpiece toward the key on the keyboard that the user desires to activate (simulate activation). Thus, the user need only move his head to orient toward a desired key, corresponding to one of the certain previously lit keys (it will subsequently be described how keys are selected to be lit), to thus simulate activation of that particular key. The detectors send signals corresponding to the detected angles of the sound wave back to the microprocessor 4. The detectors can send positional signals or signals related to change of position of a user's head.

The microprocessor then can translate this change of position into x and y coordinates and correspond the x and y coordinates to the keyboard to thus simulate activation of a selected key.

Further, regarding the predictive scanning of the present invention, by the user utilizing the "Headmaster", x and y coordinates are related to the keyboard to simulate activation of a key, as previously described. However, if this simulation results in detection by microprocessor 4 of a key which is not one of the certain previously lit keys (referenced previously and to be described subsequently in detail), no simulated activation of that key will occur. However, by utilizing a system such as the "Headmaster" in combination with a predictive scanning system limiting key activation to only certain specific keys, the microprocessor 4 can then simulate activation of the closest possible selectable key to thereby allow a user a certain margin of error in positioning his head to select a key. This will greatly improve accuracy of simulated key input.

A further example of an input device 16 is that of an infrared light detector to detect light angle and relay x and y coordinates, similar to the "Headmaster" as previously described. Further, the present invention is not limited to these previously described input devices. Any device which one of ordinary skill in the art would readily recognize as utilizable in such a system as that of either embodiment of the present invention could be substituted. Further, a modification of the previously mentioned input devices, to suit the device to a particular user's needs, abilities, or limitations, within the purview of one of ordinary skill in the art may also be utilized. Thus, instead of a headpiece, sensors on another movable body part, under selectable control by the user can also be utilized.

Hereinafter, the second embodiment will be described with regard to direct activation of keys on the keyboard (by a user pressing a key with his finger, for example), but it should be noted that activation, or simulated activation may occur by any one of the input means discussed and contemplated previously and further by any other method as would be apparent to one of ordinary skill in the art. Thus, direct selection of keys is utilized for illustrative purposes only and should not in any way be considered limiting with regard to the present invention.

Through the use of the various components of the predictive input scanning system as shown in FIG. 4, the components can conjunctively be utilized to detect activation of the system, (i.e., an ON switch, not shown) and the activation of a first of a plurality of keys (and subsequent keys) on the keyboard and for determining the symbol corresponding to the activated key in the microprocessor 4. Further, the memory 6 stores a plurality of symbol sequences, each with a plurality of symbols corresponding to a plurality of keys on the keyboard. Further, the memory stores plural word messages, one corresponding to each of the plurality of symbol sequences. The microprocessor 4 can then access the memory 6 to compare the detected symbol to the plurality of symbol sequences stored in the memory 6, to determine which of the plurality of symbol sequences begin with the detected symbol (for example) and which, of the plurality of keys 3 on the keyboard 2, correspond to each of the plurality of symbol sequences containing the detected symbol as the first symbol.

Finally, the microprocessor 4 may output a voltage of a predetermined level to visual indicators 5 (and/or audible indicators) to activate a visual indicator (and/or an audible indicator) on each of a plurality of keys 3 determined to correspond to each of the plurality of symbol sequences containing the initially detected symbol, to thereby define the limited number of keys which can produce a stored message involving the initially detected symbol. The details of this aspect of the second preferred embodiment of the present invention will be subsequently described with regard to FIGS. 7 and 9.

Figure 5A:
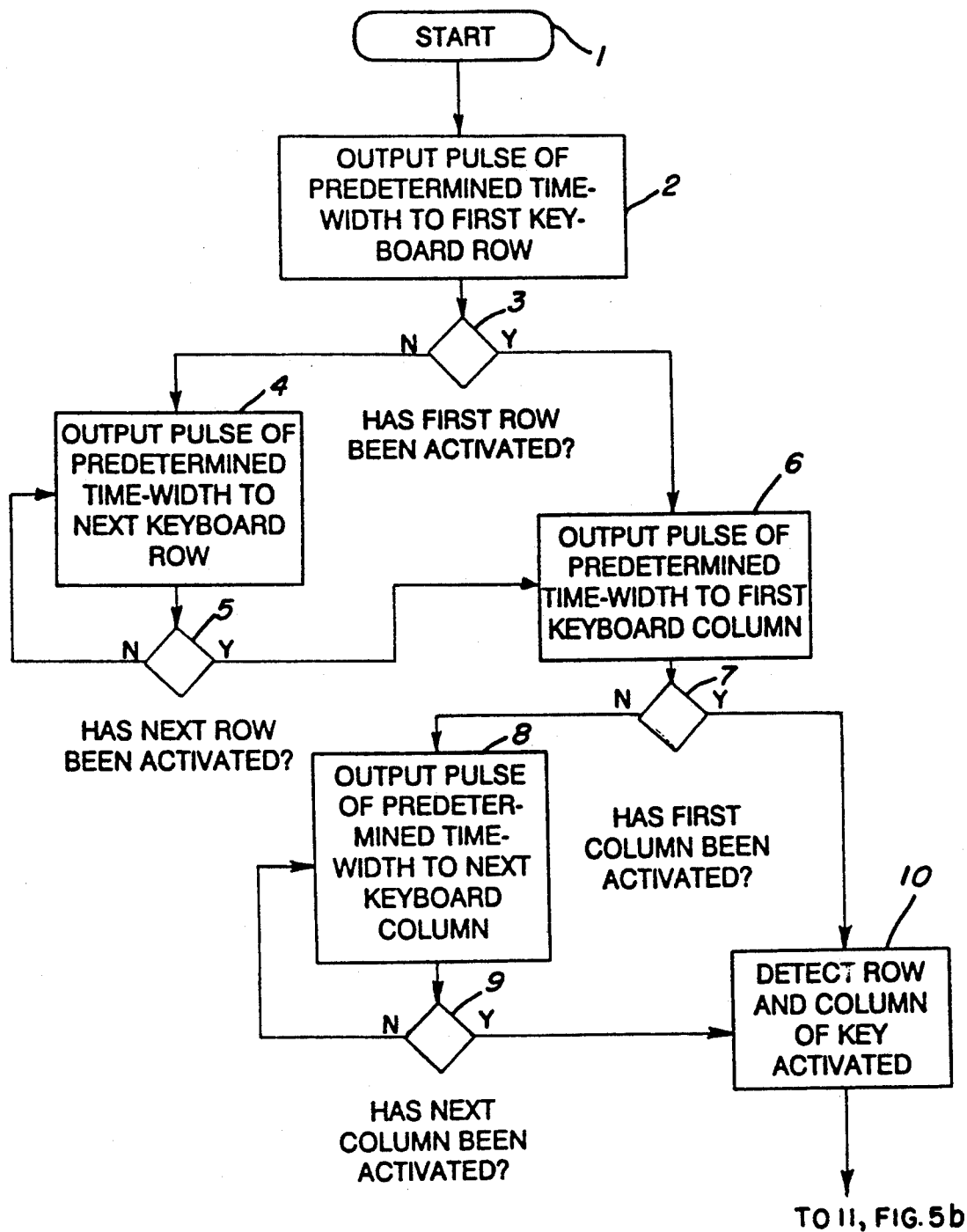
FIGS 5(a)–5(b) illustrate a flow chart corresponding to the operation of the input system shown in FIG. 3.
Figure 5B:
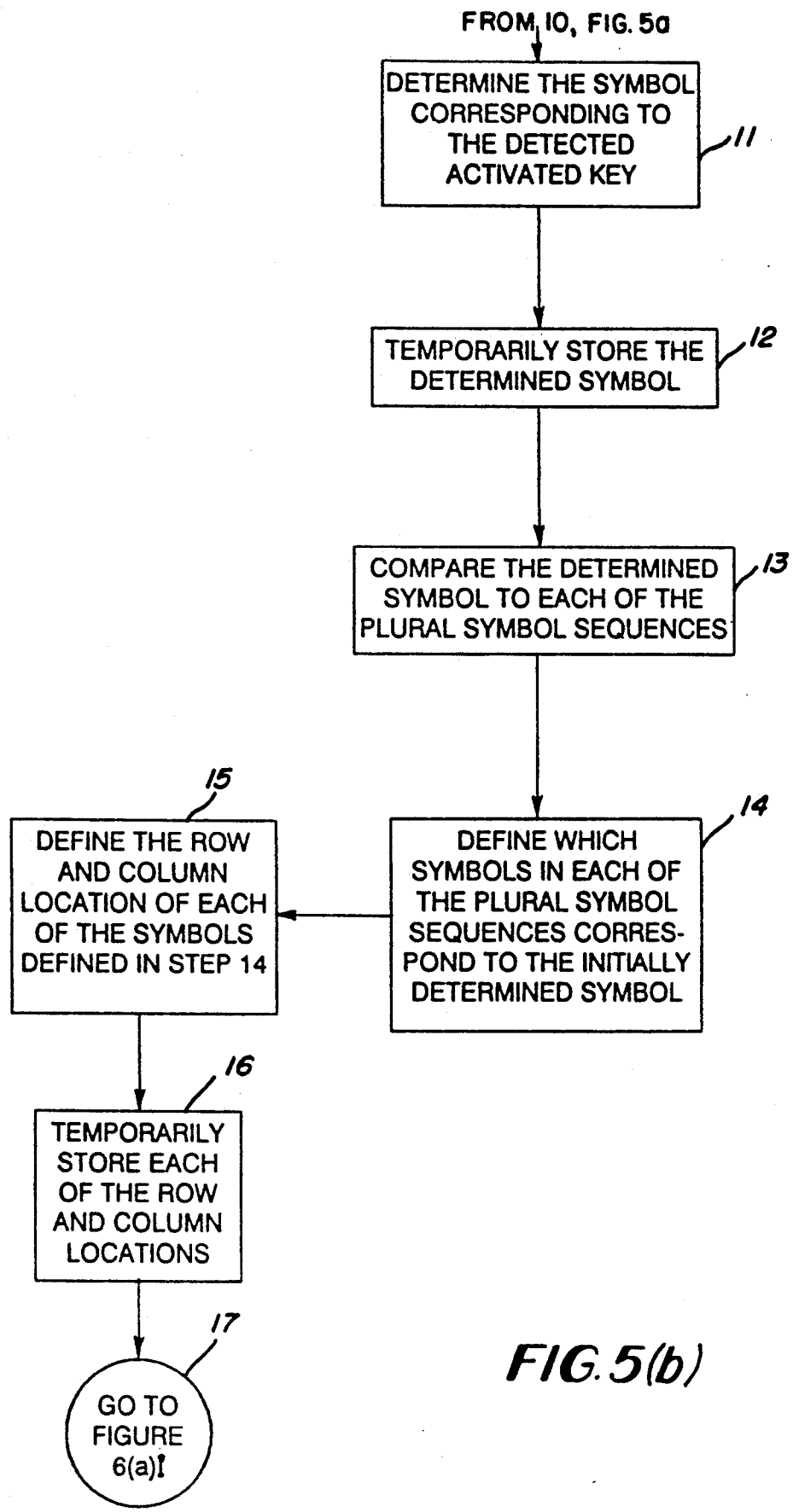

FIGS. 5(a)-5b illustrate a flow chart corresponding to the activation and initial detection of a first key activated by the predictive scanning system of the present invention, in a first preferred embodiment. Initially, the system is started. Then the microprocessor 4 outputs a pulse of a predetermined time width to the first row of the keyboard 2, corresponding to the uppermost row on the keyboard. This allows the user of the device to operate the switch 16, to actuate the first row of the keyboard if a key, corresponding to a certain polysemic symbol or icon, appears in that row. The microprocessor 4 monitors switch 16 to determine if switch 16 has been actuated indicating that the first row has been activated. If it is determined in step 3 of FIG. 5(a) that the first row has not been activated, the system moves to step 4.

At step 4, the microprocessor then outputs a pulse of a predetermined time width to the next keyboard row. The microprocessor then continually monitors switch 16 to determine if it detects actuation of the switch 16 indicating that a particular row has been activated. This is shown in step 5 of FIG. 5(a). However, if the microprocessor determines that the next row has not been activated, upon termination of the predetermined time corresponding to the output pulse of the predetermined time width previously output, the microprocessor outputs a pulse of a predetermined time width to the next keyboard row in a sequential manner. Thus, the system in this first preferred embodiment of the present invention operates in a sequential row scanning manner. Similarly, as will be subsequently described, the device operates in a sequential column scanning manner. Thus, the present invention, in this preferred embodiment, operates in a row-column scanning manner.

If it is determined that the first row has been activated in step 3 or that any of the next rows have been activated in step 5, the system then moves to step 6 of FIG. 5(a). At step 6 of FIG. 5(a), the microprocessor then outputs a pulse of a predetermined time width to the first keyboard column corresponding to the leftmost keyboard column. The system then moves to step 7 to determine whether the first column has been activated. During this time, the microprocessor continually monitors switch 16 to determine if the switch 16 has been actuated. If it is determined by the microprocessor that the first column has not been activated over the predetermined time period of the output pulse, the system moves to step 8 where a pulse of a predetermined time width is then output to the left keyboard column. Thus, as previously described, the system operates in a sequential column scanning manner, accessing each of the plurality of columns on the keyboard from left to right, sequentially.

The system then moves to step 9 to determined if the next column has been activated. Similarly, as previously described, the microprocessor continually monitors switch 16 for detection of switch actuation. If it is determined by the microprocessor that the switch 16 has not been actuated during the predetermined time period corresponding to the predetermined time width of the previously output pulse, the microprocessor then returns to step 8 and outputs a pulse of a predetermined time width to the next keyboard column. This sequential accessing of each of the columns on the keyboard, from left to right, operates in a similar manner. The microprocessor continually monitors the switch 16 and awaits its output signal indicating that the switch 16 has been actuated thus activating a particular column. Upon detecting that a particular column has been activated in steps 7 or 9 of FIG. 5(a), the system then moves to step 10.

At step 10, the microprocessor then detects which particular row and column correspond to the key which has been activated. The system then moves to step 11 where the microprocessor then determines the symbol corresonding to that detected activated key. In step 12, the microprocessor then temporarily stores the previously determined symbol. The system the moves to step 13 where the microprocessor accesses the memory 6 to compare the previously determined symbol to each of the plural symbol sequences which have been previously stored in memory 6.

With regard to the present invention, prior to the activation of this predictive scanning input system, the memory 6 has been preprogrammed with a plurality of symbol sequences corresponding to a plurality of plural word messages. The memory is provided to store complete sentences or plural word messages as described in the Background of the Invention. The plural word messages are stored corresponding to various combination or polysemic symbol sequences corresponding to polysemic symbols or icons located on a plurality of keys on the keyboard. This is possible because there exist keys on the keyboard of the present invention which bear a central image or symbol which is polysemic and illustrates an important aspect of life and/or linguistic function. Further, the keyboard may vary depending on the intellectual level of the intended operator. Therefore, each key may itself be a language symbol which has been designed for or with a specific user. Each of the polysemic symbols is rich in associations and in combination, signals language ideas to the operator's memory. This enables the generation and initial storage of plural word messages by the actuation of as few as a single key or as many as several keys.

Therefore, the memory 6 stores a plurality of plural word messages corresponding to plural symbol sequences of icons previously selected on the keyboard, to which a user can readily associate. These symbol sequences are preprogrammed into the memory, sometimes by someone of a higher intellect than that of a user or someone with higher physical capabilities to suit the needs of a user, and sometimes by the user himself.

The symbols can be programmed, for example, by a person initially accessing the "store" key. Then, the person may actuate the question mark key (corresponding to the key with the capital Q on it), the Father Time symbol (corresponding to the key with the capital T on it) and the house symbol (corresponding to the key with the capital H on it), in that order. The person can then select the "end" key and subsequently spell the sentence "What time are we going home?" This is done by sequentially inputting the letters corresponding to the above-mentioned sentence. The person can then select the store button and thus, each of the plurality of symbols in the above-mentioned symbol sequence will be stored in the memory 6, along with a corresponding plural word message or sentence. This symbol sequence, of three symbols, is merely utilized for representational purposes only and the present invention is not limited to such three symbol sequences. Sequences may correspond to as few as a single symbol or as many as several symbols (for example, 7). Other similar methods for storing symbol sequences and their associated messages may also be used.

As previously described, with regard to FIG. 5(b), upon temporarily storing the determined symbol in step 12, the microprocessor then accesses the memory 6 to compare the determined symbol to each of the plural symbol sequences stored in the memory to determine which symbol sequences begin with the determined symbol. These plural symbol sequences, and corresponding plural word messages, are preprogrammed into the memory, by a method as previously described, or by any similar or compatible storage method.

The system then moves to step 14 where it is defined which of the symbols in each of the plural symbol sequences follow the initially determined symbol in each symbol sequence. The microprocessor then defines the row and column location of each of the symbols defined in step 14 and step 15 of FIG. 5(b). Therefore, upon defining these row and column locations, the system moves to step 16 where each of the row and column locations are temporarily stored within a memory. The system then moves to step 17 which will be subsequently described with regard to FIGS. 6(a)I–II and FIGS. 8a–d. However, it is to be noted that upon completing step 16 of FIG. 5(b), the initial activation of a first key has been detected and the predictive scanning of the present invention can now be operated (it should be noted that predictive scanning can start merely by activating the system also, thus this is merely exemplary) to aid the user by defining a limited number of keys which can produce a stored message involving the initially detected symbol corresponding to the initially activated key.

In FIGS. 6(a)I–II, the microprocessor initially determines if any of the previously defined symbols of the plural symbol sequences following the initially detected symbol are located in the first row of the keyboard. In other words, does the first row contain one or more of the limited number of previously defined keys or more of the limited number of previously defined keys established with regard to FIGS. 5(a)–5(b)? Upon determining that the first row does not contain one or more of the limited number of previously defined keys in step 1 or FIG. 6(a)I, the system then moves to step 2. At step 2, the microprocessor then does not access the first row of the keyboard. The system then moves to step 3 where the microprocessor determines whether the next row contains one or more of the limited number of previously defined keys. Upon determining that the next row does not contain one or more of the previously defined keys, the system reverts back to step 2 where the microprocessor constantly will not access each of the plurality of rows that does not contain one or more of the limited number of the previously defined keys.

However, upon the microprocessor detecting that the first row does contain one or more of the limited number of the previously defined keys in step 1, the system then moves to step 4. At step 4, the first keyboard row is accessed to enable activating of that row by the scanning device, in a similar manner to that previously described with regard to step 2 of FIG. 5(a). However, as previously described with regard to step 2 of FIG. 6(a)I, a keyboard row will only be accessed if it is detected that that row contains one or more of a limited number of previously defined keys. Therefore, upon determining that the row does not contain one or more of the limited number of previously defined keys, that row is not accessed.

Upon accessing the first row in step 4, the system then moves to step 5 where an output pulse of a predetermined time width, and further of a predetermined voltage, is then sent to the visual indicators of LEDs of the first keyboard row, and to each column corresponding to all of the limited number of previously defined keys in that row to light each of the corresponding LEDs. Therefore, as previously described with regard to FIG. 3, the microprocessor outputs a voltage of a predetermined voltage level to both the row and column of each of the LEDs corresponding to the limited number of previously defined keys in that row, to light each of the corresponding LEDs. By successfully lighting each of the corresponding LEDs in that row, which correspond to the limited number of previously defined keys which can produce a stored message involving the initially detected symbol, a predictive scanning input system of the present invention is achieved. Thus, the user can clearly see, by use of the visual indicators which of the plurality of keys may be actuated, to access one of the previously stored messages.

Further, in a conventional row-column scanning system, each of the columns and rows are sequentially activated. However, in the predictive scanning row-column input system of the present invention, as shown in FIG. 3, and described with regard to FIGS. 5(a)–5(b) and 6(a)I–II and 6(b)I–II, only rows which correspond to the limited number of previously defined keys which can produce a stored message involving the initially detected symbol, are sequentially accessed. This, therefore, provides a quick and efficient system which skips unnecessary rows corresponding to keys which cannot access a stored message, and fully visually indicates to the user which of the plurality of the keys in an accessible row corresponds to keys which can produce a stored message involving the initially detected symbol.

Subsequently, upon lighting the limited number of previously defined keys in the first row in step 5, it is determined in step 6 if the first row has been activated. Therefore, as previously described, the microprocessor monitors the switch 16 for actuation indicating that the input device 16 has activated that particular row. Upon the microprocessor not detecting that the first row has been activated, the system reverts back to step 3 where it is determined whether or not the next row contains one or more of the limited number of previously defined keys. Subsequently, the system advances to step 7 of FIG. 6(a)I.

At step 7, the microprocessor then outputs a pulse of a predetermined time width to the next keyboard row to enable accessing of that row by the scanning device. Further, at step 8 of FIG. 6(a)II, the microprocessor outputs a pulse of a predetermined voltage to the visual indicators or LEDs of that next keyboard row and to each column corresponding to all the limited number of keys in that row to light the corresponding visual indicators or LEDs. Therefore, similar to step 5 of FIG. 6(a)I, a visual indicator is activated for each of the plurality of keys, in the row made accessible by way of steps 3 and 7 of FIG. 6(a)I, which were previously determined to correspond to each of the symbols following the detected symbol in each of the plurality of symbol sequences containing the detected symbol of the initially activated key as a first symbol. This thereby defines a limited number of keys which can produce a stored message involving that detected symbol as a beginning symbol.

Subsequently, in step 9, it is determined whether or not that next row has been accessed. The microprocessor monitors the switch 16 to determine if the switch 16 has been actuated. If the microprocessor does not detect the signal from switch 1 6 indicating that the row has been accessed, the system subsequently reverts back to step 3 where it is determined if the next row contains one or more of the limited number of previously defined keys. However, if it is determined that the next row has been accessed in step 9 or that the first row has been accessed in step 6, the system then moves to step 10.

At step 10, it is determined whether or not the first column contains one of the limited number of previously defined keys, similar to that of steps 1 and 3 corresponding to the rows of the keyboard. Thus, the microprocessor then checks the temporarily stored row and column locations previously defined as corresponding to symbols which were found to be symbols following the detected symbol in plural symbol sequences containing the initially determined symbol as a first or beginning symbol. Upon the microprocessor determining that the first column does not contain one or more of the limited number of previously defined keys, the system then moves to step 11 where the microprocessor does not access the first column of keys on the keyboard and thus that column is not made accessible to the user. This is because that first column was determined not to contain any symbols which follow the detected symbol in at least one of the plurality of symbol sequences containing the initially detected symbol, corresponding to the initially activated key as a first symbol. Therefore, by not accessing that particular column, the system will be able to clearly define only a limited number of keys which can produce a stored message involving the initially detected symbol and initially activated key as a first symbol.

At step 12, it is then determined whether or not the next column contains one of the limited number of previously defined keys. If it is determined that this next column does not contain one of the limited number of previously defined keys, the system will then revert back to step 11 and that next column will be non-accessible to the user. By the row-column scanning system of the present invention, skipping plural rows and columns which do not contain symbols which follow the detected symbols in at least one of the plurality of symbol sequences containing the initially detected symbol as a first symbol, only a limited number of keys will be defined which can produce a stored message involving the initially detected symbol. Further, rows and columns which do not contain one of the limited number of previously defined keys, will not be made accessible to the user. Thus, the speed and efficiency of the system is clearly increased, as well as being made more easily accessible to the user by lighting visual indicators corresponding to only the limited number of the previously defined keys in a particular row or column.

Upon determining that the first column does contain one or more of the limited number of previously defined keys in step 10 of FIG. 6(a)II, the system then moves to step 13. At step 13, the first keyboard column is accessed to enable that column by the scanning device. Further, in step 14, as shown in FIG. 6(b)I, an output pulse of a predetermined voltage is output to the visual indicator of the previously activated keyboard row and the previously determined accessible column. Therefore, in step 15, the user can then activate that particular column by way of the scanning device 7. At step 15, the microprocessor determines if the switch 16 has been actuated to activate the first column. However, if the microprocessor determines that the first column has not been activated, the system reverts back to step 12.

If the microprocessor determines that the next column does contain one of the previously defined keys in step 12 of FIG. 6(a)II, the system then moves to FIG. 6(b)I. Subsequently, the next keyboard column is accessed to enable accessing of that column by the input device 16. Further, in step 17, an output pulse of a predetermined voltage is then sent from the microprocessor 4 to the visual indicator or LED 5 corresponding to the previously activated keyboard row and previously determined accessible keyboard column. At step 18, the microprocessor then determines if that next column has been activated. The microprocessor monitors the switch 16 to determine if the switch 16 has been actuated indicating that the next column has been activated. If it is determined that the next column has been activated in step 18, or that the first column has been activated in step 15, the system then moves to step 19 where the microprocessor then detects the row and column of the key which has been activated. Subsequently, the system moves to step 20.

In step 20, the microprocessor then determines the symbol corresponding to the detected activated key. Upon determining this symbol, the microprocessor then temporarily stores this determined symbol in the memory with all previously determined symbols as a symbol sequence in step 21. In step 22, the microprocessor then accesses the memory 6 to compare this temporarily stored sequence with a plurality of stored symbol sequences in memory. At step 23, the microprocessor determines if the temporarily stored symbol sequence corresponds to any one of the stored symbol sequences and memory. If the microprocessor determines that this temporarily stored symbol sequence does not correspond to any one of the stored symbol sequences in memory, the system returns to the start step of FIG. 6(a)I, such that rows and columns which correspond to symbols following the detected symbols in at least one of the plurality of symbol sequences containing the detected symbols as a first and second symbol can be activated. Therefore, a third key may then be activated corresponding to a third symbol which then may form a symbol sequence in conjunction with the previously detected symbols, to form a symbol sequence which can produce a stored message. Thus, subsequent input of plural additional symbols can be achieved. It is further noted that further plural keys may be activated to access stored messages corresponding to symbol sequences of more than three symbols. Thus, the above-mentioned process is merely continuously repeated to access further symbols and therefore the system is not limited to one, two or three symbol sequences.

If the microprocessor determines that the temporarily stored symbol sequence does correspond to any one of the stored symbol sequences in memory in step 23, the system then moves to step 24. At step 24, the microprocessor then accesses these stored plural word messages from memory relating to the corresponding stored symbol sequence. This plural word message may then be output to a specialized processor 10 as shown in FIG. 2 in step 25. Further, the specialized processor 10 can then process the plural word message and then output the message through an output device such as speaker 14. Therefore, a predictive scanning input system, utilizing a row-column scanning method can be achieved to aid the user in predicting which of a plurality of keys can be depressed which correspond to the plurality of symbol sequences containing an initially detected symbol. This thereby defines a limited number of keys which can produce a stored message involving an initially detected symbol. Further, the row-column scanning system of the present invention also utilizes the predictive scanning of the present invention to allow only certain of the rows and columns accessible to the user. Thus a much more efficient system, as well as a much more helpful user friendly type system, is achieved.

Alternatively, or as an option which can function concomitantly with the system described above, the system operator may be provided with an auditory prompt or cue during the scanning of rows and columns. As each row is scanned which contains keys which can be activated which correspond to a system which can be selected to successfully produce or to lead to the production of a stored message (steps 4 and 7 of FIG. 6(a)I), an auditory prompt is generated which informs the system operator as to which row is being scanned. This auditory prompt is pre-defined and is stored in memory 6 to be accessed by microprocessor 4. Since this is designated as an auditory prompt message, it will be generated by the specialized processor 10, while microprocessor 4 configures the analog switch 17 such that the audio output produced is routed to amplifier circuit 19 and thus to external speaker or earphone 21 (if no such circuit or speaker is available, this audio output may optionally be routed through amplifier circuit 18 and thus to speaker 14).

Similarly, once input device 16 has been activated to effect the selection of a row, scanning continues across those columns corresponding to key locations which can be activated which correspond to a symbol which can be selected to successfully produce or to lead to the production of a stored message. As each such location is scanned (steps 13 and 16 of FIG. 6(a)I and 6(b)I, respectively), an auditory prompt is generated which informs the system operator as to which particular key location is being scanned. This procedure allows the system operator to use input device 16 and the generated auditory feedback to activate any key location corresponding to any symbol which can be selected to successfully produce or to lead to the production of a stored message, without scanning through locations corresponding to symbols which do not lead to the production of a stored message, and without needing to observe any visual display 7.

Alternatively, this auditory feedback may also be provided simultaneously with the corresponding illumination of visual display 7 (steps 5, 8, 14 and 17 of FIGS. 6(a)I-II and 6(b)I to supplement and augment the feedback provided to the system operator during the scanning process. This particular row-column scanning technique described here is used as an illustrative example, and does not limit the present invention nor exclude its application to other similar scanning techniques (such as a column-row scan, quadrant scan, two-switch or three-switch scanning, directed joystick scanning or other scanning technique well known to someone of ordinary skill in the art).

Figure 7A:
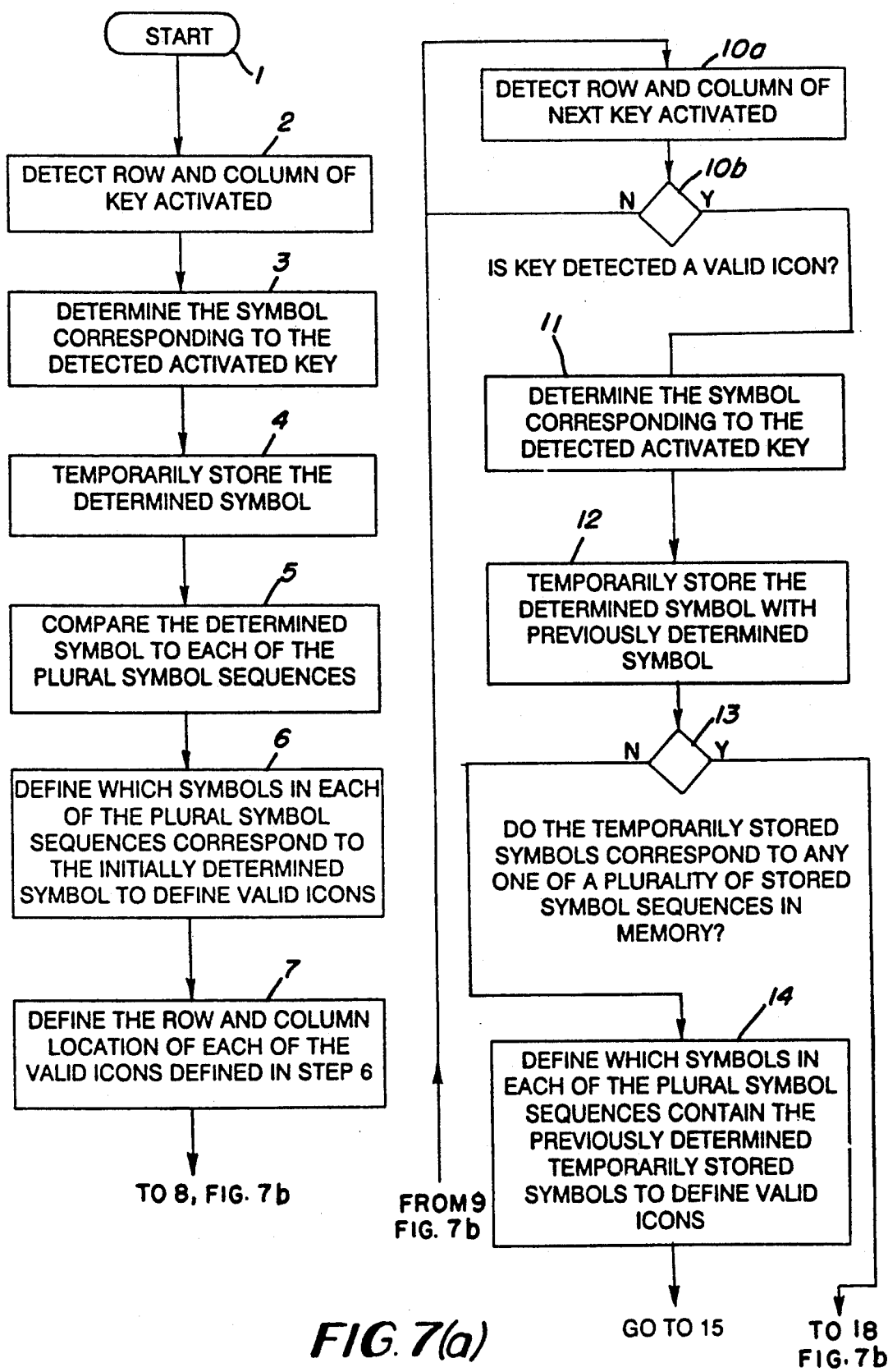
FIGS. 7(a)–7(b) illustrate a flow chart corresponding to the operation of another preferred embodiment of the present invention illustrated in FIG. 4.
Figure 7B:
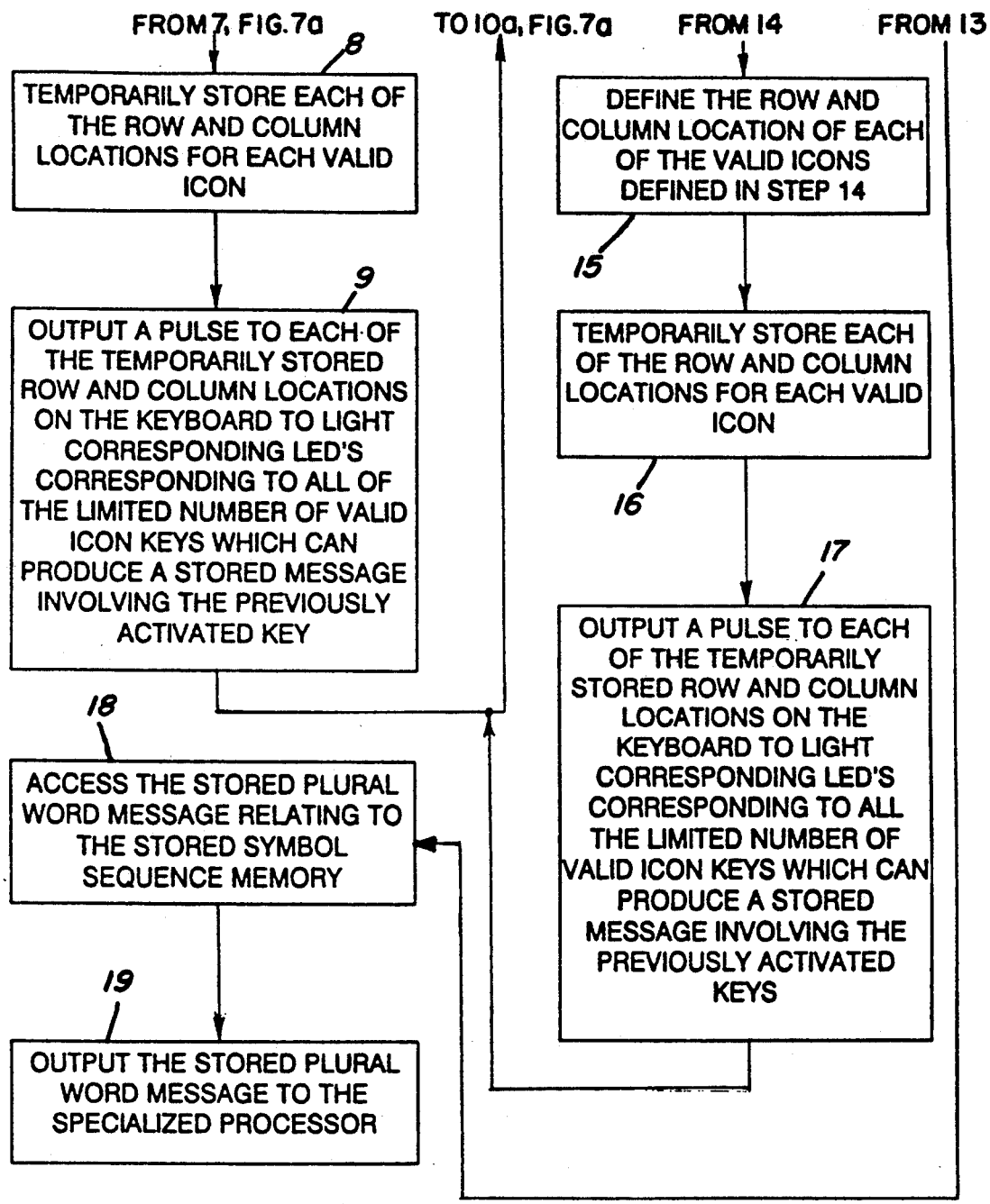
Figure 8B:
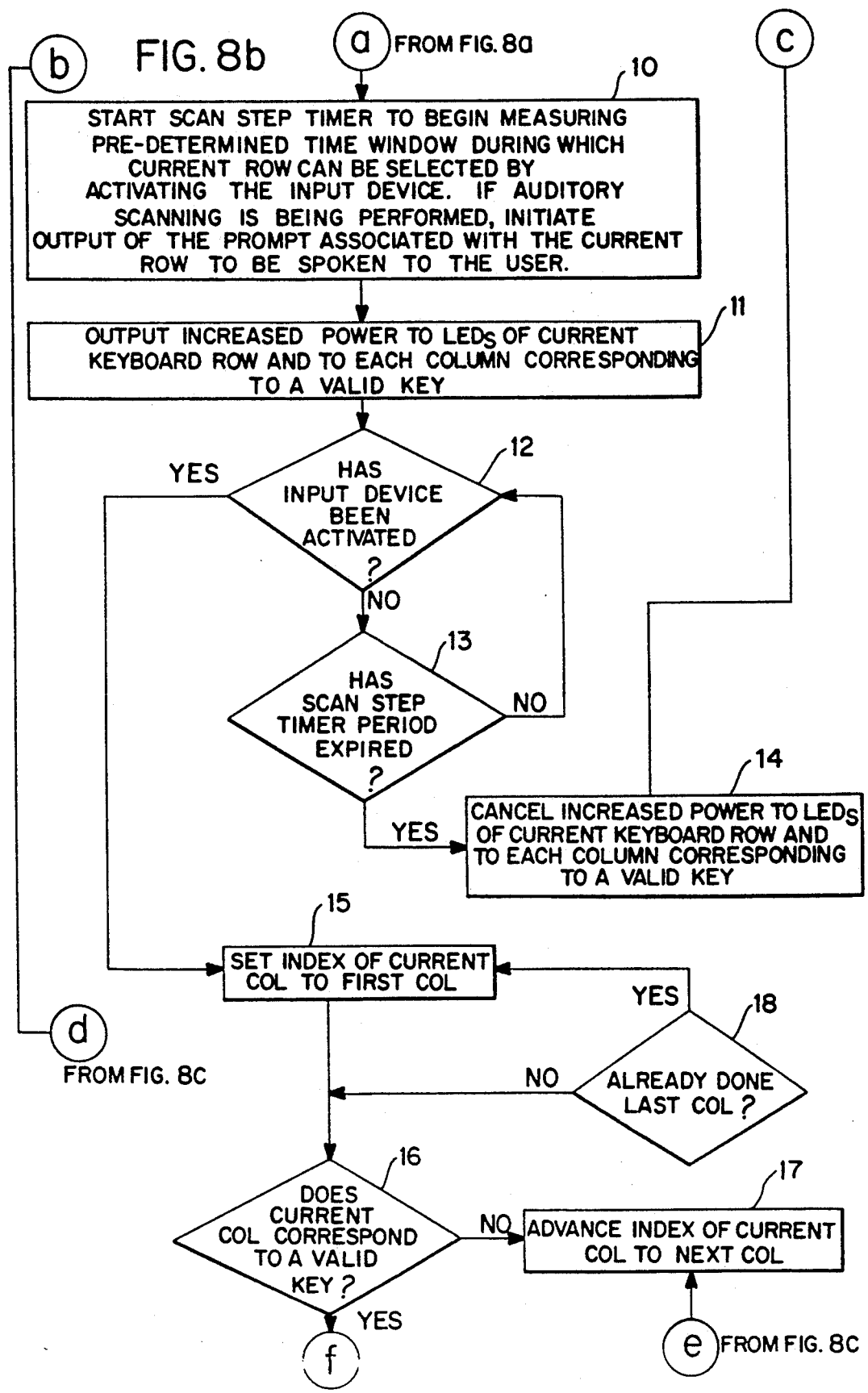
FIGS. 8 a–d illustrate a flow chart corresponding to yet another preferred embodiment of predictive row-column scanning, shown in FIG. 3.

FIGS. 7(a)-7(b) illustrate the operation of a second preferred embodiment of the present invention, corresponding to that of FIG. 4. This embodiment of the present invention utilizes the predictive scanning input system, but merely allows for activation of each of the plurality of keys on the keyboard by direct activation of one of the plurality of previously mentioned systems, other than that of a switch in row-column scanning. Activation of each of the plurality of keys in this embodiment of the present invention may be achieved by means of a user's finger or any other appendage which he can utilize to depress any one of the keys on the keyboard; a headstick which can be used to active and depress any of the plurality of keys by movement of a user's head; or any other equivalent type of input devices previously described for direct key activation. This embodiment will be described with regard to direct key depression for activation but is not limited to such a system. The keys may be activated by any of the previously mentioned input devices 16 or any other method of direct key selection as is known to one of ordinary skill in the art.

Initially, in step 1 of FIG. 7(a), the system is started. However, subsequent to the start of the system, the memory 6 may be preprogrammed with a plurality of symbol sequences corresponding to a plurality of stored messages suited to the user's needs and abilities, as previously described with regard to the first preferred embodiment of the present invention.

The system, after the start in step 1, then moves to step 2 wherein the microprocessor then detects the row and column of the key which has been activated by the user. Upon a user depressing a particular key 3, the switch 9 will close and a signal will be detected by the microprocessor 4. From this signal, the microprocessor can then detect the row and column of the key activated in step 2.

At step 3, the microprocessor then determines the symbol corresponding to the detected activated key. The symbol is then temporarily stored in step 4 and subsequently the system moves to step 5.

In step 5, the microprocessor then accesses the memory 6 for each of the plurality of previously stored symbol sequences. This plurality of previously stored symbol sequences are then compared with the previously determined symbol corresponding to the detected activated key of step 3. By comparing the symbol to each of the plurality of symbol sequences in step 5, the microprocessor can then move to step 6 to define which symbols in each of the plurality of symbol sequences contain the initially determined symbol as a first symbol. Therefore, the microprocessor determines which symbols are symbols following the detected symbol of the plurality of symbol sequences containing the initially detected symbol as a first symbol. This thereby defines a limited number of keys or valid icons which can produce a stored message involving the initial detected symbol as a first symbol. Then, in step 7, the microprocessor defines the row and column location of each of the symbols or valid icons previously defined in step 6.

In step 8, the microprocessor then temporarily stores each of the row and column locations corresponding to the previously defined valid icons of step 6. A pulse of a predetermined voltage is then output to each of the temporarily stored row and column locations on the keyboard in step 9, to light corresponding visual indicators or LEDs corresponding to all of the limited number of keys which can produce a stored message involving the previously activated key. Therefore, by lighting each of the plurality of LEDs which correspond to the previously defined limited number of valid icon keys which can produce a stored message involving the initially detected symbol, a predictive scanning input system of this embodiment of the present invention conveys to the user which keys are available for subsequent activation. The LEDs act as visual indicators to aid the user in making his next selection.

The system then moves to step 10a where the microprocessor, in conjunction with the keyboard 2, detects the row and column of the next key activated similar to that of step 2. In step 10b, the system then determines if the next key activated is one of the valid icon keys previously determined. By only defining a limited number of valid icon keys, the system has limited the possibility of user input error by the user depressing the wrong key. In a normal keyboard, the keys are fairly close together, and thus if a user is slightly impaired in his capability for key input, a mistake depression of the wrong key will likely not cause input error. This is because only certain of a limited number of keys can be activated. Upon the system detecting a key which is not one of the previously defined valid icon keys, the system merely reverts back to step 10a and waits for input of a valid icon key.

Further, regarding the previously mentioned alternate input system of the "Headmaster" or a system utilizing detection of output infrared light, after step 8 of defining and storing the row and column locations for each valid icon key (here the x and y coordinates of the keys on the keyboard) and step 9 of lighting valid icon LEDs, the system then outputs a sound wave, for the ultrasonic system, or a light wave, in an infrared system, through output device 7. Then a detector, or plural detectors, detect the sound or light wave at input device 16, located on the user's head, for example, and determines the x and y location of the key toward which the user is oriented (the direction of his head). Therefore, the user can activate a key merely by positioning his head appropriately for the duration of a predefined time threshold and subsequently simulate activation of a next key at step 10a. Further, the previously mentioned systems are not limited to detection of x and y coordinates, they may detect Δx and Δy or change in x and y positions of the user's head. The use of x and y coordinate locations will hereinafter be described, but it should be known that the present system is not so limited.

By previously defining only a limited number of valid icon keys, erroneous simulated key activation can be reduced. As the x and y coordinate location of a key the user desires to activate is detected by input device 16, these x and y coordinates are then relayed, via wire 11, through input port 13, to microprocessor 4. The microprocessor then relates these x and y coordinates to the keyboard and determines which key corresponds to the x and y coordinates. Then, in step 10b, the microprocessor determines if the corresponding key is one of the previously defined valid icon keys. If the determined key is not one of the valid icon keys, the microprocessor then locates the valid icon key within the closest proximity of the determined key. Therefore, by defining only a limited number of valid icon keys, chance of user input error is strongly reduced. Thus, if a user desires to activate one of the valid icon keys by one of the previously mentioned input systems, he has a larger average area of selection than if each of the plurality of keys could be activated. Thus, if the system detects the wrong key, and this key is not a valid icon key, erroneous selection will not occur and ease and speed of use substantially increases.

When a person with disabilities uses headpointing technology such as the "HeadMaster", selecting an icon may require concentration and physical effort. The more valid icons present, the more accurate the system user needs to be in his or her selection. When the first icon of a sequence is selected, a large number of valid icons may be present. The system user has to adjust his or her neck and head muscles when head pointing accurately in a fine manner.

Pointing in a fine, accurate manner can cause fatigue for users with physical disabilities. Reducing the number of icons predicted for the first selection can be an important factor in reducing the cognitive and physical demands of access. However, when the second icon is to be selected, many fewer valid sequence choices will be predicted, thus rendering pointing even less demanding. Less concentration and less physical effort are required. The third icon is often chosen from a very small field of predicted valid sequence choices, thus making the third selection even less cognitively and physically demanding.

The use of a communication system throughout a day can be fatiguing. A progressive reduction of fatigue-causing factors throughout a sequence is an important element in overall communication aid use. It enhances both willingness to communicate, mean length of utterance, and the richness of vocabulary selection in use for communication.

Users with disabilities often have difficulty in accessing keys with their fingers. Neurological impairments often bar rapid, easy use of fingers. Often one finger alone or two fingers of one hand are used in direct digital selection of keys by system operators with physical disabilities. What is true of headpointing technology is often true for direct actuations by hand. Having predicted keys easier to select than non-predicted ones can facilitate ease and speed for hand selection as well. Often what is true for people with disabilities is also true for the able-bodied population.

By altering the relative ease of selecting a valid icon, the system can help eliminate the chance of erroneous activation while still allowing the user to activate locations which are not valid icons. As an example, a user may occasionally need to activate a nonvalid icon in order to select a differing input mode as described in patent application Ser. No. 07/633,535. By changing the standard parameters related to headpointing activation (for example, target size, dwell time and window length), these secondary keys can remain accessible, but more difficult to activate and thus less likely to be activated unintentionally.

More particularly, when a user desires to activate one of the plurality of predefined predicted keys (indicated to the user through an audible or visual activation device), a dwell time of between one-half of a second to one and one-half seconds exists, for example. That means that a user using the "Headmaster", for example, must dwell on such a desired key for a first predetermined time of one-half second to one and one-half seconds before such a selected key becomes an activated key. Once activated, the corresponding symbol can be detected and the system operates as previously described.

Further, if a user desires to activate a key which is not one of the predefined predicted keys, a dwell time of a second predetermined time of one to three seconds, or a smaller target area, or other parameters exist which keys more difficult to activate. Since such a key will be rarely desired, it is made more difficult to activate. It should be noted that these dwell times are merely exemplary and can be varied to suit a user's desires or abilities, such as head control.

Finally, when a user desires activation of a predicted key he can activate such a key by merely selecting a key proximate to the desired key. The key is detected as being selected upon the "Headmaster", for example, maintaining selection of the key for the first predetermined period of time. Then, if the key is a predicted key, the system operates as previously described. However, if the key is determined to be a nonpredicted key, then the location of the selected key is determined. The microprocessor then determines which of the predicted predefined limited number of keys is in closest proximity to the selected key. Simulated activation of this closest proximate key then occurs and the system operates as previously described.

Once a valid icon key is detected, the system proceeds via step of FIG. 7(a). Similarly to that mentioned previously regarding the step following step 9 of FIG. 7(a), upon detecting that the symbols do not correspond to a symbol sequence in step 13, and defining valid icon keys and their locations and lighting corresponding LEDs, after step 17 and for each subsequent key activation, an output sound or light wave will be sent from output device 7.

The system then moves to step where it is determined which symbol corresponds to the detected activated key and that determined symbol is subsequently temporarily stored in a temporary memory of the microprocessor with previously determined symbols, in step 12.

In step 13, the microprocessor then accesses the memory to determine whether the temporarily stored symbols in the temporary memory of the microprocessor correspond to any one of the plurality of stored symbol sequences in memory. If it is determined, during this comparison of the temporarily stored symbols with that of each of the plurality of stored symbols sequences in memory, that the temporarily stored symbols do not correspond to any one of the plurality of stored symbol sequences in memory, the system moves to step 14. In step 14, it is again defined which of the plurality of symbol sequences contain the symbols previously stored in the temporary memory of the microprocessor. Each of the symbols immediately following the previously detected symbols in symbol sequences which contain the temporarily stored symbols (as a first and second symbol) are then defined as a new set of valid icon keys (each key corresponding to an immediately following symbol) in step 14.

In step 15, the row and column locations of each of the symbols defined as valid icon keys in step 14, are then defined. The system then moves to step 16 where each of the row and column locations of the valid icon keys are temporarily stored. In step 17, a pulse of a predetermined voltage is then output to each of the temporarily stored row and column locations on the keyboard to light visual indicators 5 corresponding to the valid icon keys. These visual indicators or LEDs correspond to the limited number of valid icon keys which can produce a stored message involving the previously activated keys. Thus, this will aid the user in making his selection of subsequent keys. Upon outputting this pulse of a predetermined voltage in step 17, the system then reverts back to step 10 where the row and column of a next key are activated or detected. Thus, a plurality of symbols defining a symbol sequence can be utilized to access a plural word message. Any number of symbols from one (1) to seven (7), for example, may be utilized.

However, in step 13 if it is determined that the temporarily stored symbols correspond to any one of the plurality of stored symbol sequences in memory, during the comparison of the temporarily stored symbol sequences with each of the plurality of stored symbol sequences in memory (that is, that the last detected symbol is an end symbol in a symbol sequence with no immediately following symbol), the system then moves to step 18. At step 18, the plural word message corresponding to the stored symbol sequence in memory which was previously determined to correspond to the temporarily stored symbols, is then accessed. This plural word message is then output to the specialized processor 10 as shown in FIG. 2 and step 19 of FIG. 7(b). Subsequently, this plural word message can be processed by a specialized processor 10 and then subsequently output through a speaker 14. The output of the specialized processor, or speech synthesizer, for example, in turn coupled to the speaker 14, can then allow the user to generate audible synthetic speech in a manner which is quick and easily accessible to the user.

Alternatively, or as an option which can function concomitantly with the system described above, the system operator may be provided with an auditory prompt or cue when directly activating individual keys (at step 10a in FIG. 7). As a particular is activated which corresponds to a symbol which can be selected to successfully produce or to lead to the production of a stored message (step 10b in FIG. 7), an auditory prompt is generated which informs the system operator as to the symbol associated with that key. This auditory prompt is pre-defined and is stored in memory 6 to be accessed by microprocessor 4.

Since this is designated as an auditory prompt message, it will be generated by the specialized processor 10, while microprocessor 4 configures the analog switch 17 such that the audio output produced is routed to amplifier circuit 19 and thus to external speaker or earphone 21 (if no such circuit or speaker is available, this audio output may optionally be routed through amplifier circuit 18 and thus to speaker 14). If the particular key which is activated does not correspond to a symbol which can be selected to successfully produce or to lead to the production of a stored message (step 10b in FIG. 7), the same auditory prompt may be generated to inform the system operator as to the symbol associated with that key, or an alternative auditory prompt may be generated to inform the system operator of some other characteristic of that key, or simply inform the system operator that the symbol associated with that key will not successfully produce or to lead to the production of a stored message following the previously activated symbols.

One a particular key is activated by closing the switch associated through direct physical contact (step 10a in FIG. 7(a)), the associated auditory prompt will begin to be spoken through the private auditory feedback channel as described above, and will continue to be spoken as long as the key remains depressed. A timer will also be started to measure how much time has elapsed since the key was first depressed. If on hearing the associated auditory prompt, the user determines that this is the key which he wishes to activate, the activation can be effected by maintaining the key in a depressed state beyond a predetermined time threshold. At that time, the system would move on to step 11 of FIG. 7(a).

Alternatively, the user may release the key and then depress it once again within the same time window as above to immediately effect the activation of that key at the time of the second depression (even though this occurs prior to the expiration of the time threshold required for activation by continuously holding the key down). As in the case where the key is activated by maintaining it in a depressed state past a time threshold, at that time the system would also move on to step 11 of FIG. 7(a). As above in the case of auditory scanning methods, this auditory feedback may also be provided simultaneously with the corresponding illumination of visual display 7 to supplement and augment the feedback provided to the system operator during the key selection and activation process. The particular method for direct activation of keys as described here is used as an illustrative example, and does not limit the present invention nor exclude its application to other similar direct selection techniques (such as a proportional joystick, headpointing system or other selection technique well known to someone of ordinary skill in the art).

In another preferred embodiment, FIG. 8 shows a flowchart of the process for predictive scanning using icon prediction for the specific example of row-column scanning. The system begins at step 1 by initializing the temporarily stored symbol sequence in the icon buffer to the null sequence (empty), with the icon cursor necessarily located at the start of the icon buffer. In step 2, the system compares the temporarily stored symbol sequence in the icon buffer with the plurality of stored symbol sequences in memory. This is also the step to which the system returns after failing to find an exact match for the temporarily stored sequence in the icon buffer with any of the stored sequences in memory in step 27. Then in step 3, the system determines from the comparison in step 2 which of the plurality of stored symbol sequences in memory can match the symbol sequence prefix and suffix determined by the contents of the icon buffer and the position of the icon cursor in the buffer. This enables the system in step 4 to determine the set of icons which occur in the matching sequences corresponding to the position of the icon cursor (following the icons of the determined prefix in the matching sequences identified in step 3). These are the icons regarded as being "valid" for the purposes of icon prediction. In step 5, the system determines the row and column locations of the keys which correspond to any of the set of valid icons determined in step 4. At this time, the system outputs a predetermined level of power to the LEDs at each of these locations. The system is ready at this point to begin the scanning process to allow the user to select and activate the next desired key and its associated symbol.

To begin the scanning process, in step 6 the system sets the index of the current row being examined and potentially scanned to the first row. At step 7, the system determines whether the current row contains any valid keys. If not, it proceeds to step 8 where it advances the index of the current row to next row, and then at step 9, it determines whether the scan has already proceeded through all of the rows. If the scan has not yet reached the last row, the system simply returns to step 7 and examines the new current row for valid keys. If it has, the system returns to step 6 and continues after resetting the index of the current row being examined and potentially scanned to the first row.

However, if the system determines in step 7 that the current row does indeed contain one or more valid keys as previously defined, it proceeds to step 10 in which the system starts a scan step timer to begin measuring a predetermined time window during which the current row can be selected by the user by activating the input device (a switch, for example, as discussed previously). Furthermore, if auditory scanning is being performed, at this time the system initiates output of the auditory prompt associated with the current row to be spoken to the user over the private feedback audio channel. The system proceeds immediately to step 11, where virtually simultaneously, the system begins to output increased power to the LEDs of the current keyboard row and to each column corresponding to a valid key. Alternatively, the LEDs could be flashed intermittently, or the LEDs of the entire current row could be more brightly lit, or some other technique which would be readily apparent to one of ordinary skill in the art could be utilized to indicate to the user which row is the current row and is thus available for selection through activation of the input device.

Having indicated the accessibility of the current row to the user in step 11, the system then waits (in steps 12 and 13) to see if the user activates the input device prior to the expiration of the pre-determined time window available for the selection of the current row as determined by the scan step timer which was started in step 10. If the end of this time window is reached with no switch activation being detected, the system proceeds to step 14 and cancels the increased power that was sent in step 11 to the LEDs of the current keyboard row and to each column corresponding to a valid key. This returns the LEDs of the keyboard to the state established in step 5. Having done so, the system returns to step 8 and continues from there as before.

However, if the system does detect a switch activation at step 12 prior to the expiration of the pre-determined time window, the system then proceeds to step 15 having established the selection of the current row by the user. To continue the scanning process, the system then scans across the columns of the selected row to enable the user to select a specific location in that row. Thus, in step 15 the system sets the index of the current column being examined and potentially scanned to the first column. At step 16, the system determines whether the current column position corresponds to a valid key. If not, it proceeds to step 17 where it advances the index of the current column to the next column, and then at step 18, it determines whether the scan has already proceeded through all of the columns. If the scan has not yet reached the last column, the system simply returns to step 16 and examines the new current column to see if it corresponds to a valid key. If it has reached the last column, the system returns to step 15 and continues after resetting the index of the current column being examined and potentially scanned to the first column.

However, if the system determines in step 16 that the current column does indeed correspond to one of the valid keys as previously defined, it proceeds to step 19 in which the system starts a scan step timer to begin measuring a predetermined time window during which the current row and column location can be selected by the user by activating the input device (a switch, for example, as discussed previously). Furthermore, if auditory scanning is being performed, at this time the system initiates output of the auditory prompt associated with the current row and column location to be spoken to the user over the private feedback audio channel. The system proceeds immediately to step 20, where virtually simultaneously, the system begins to output increased power to the LED of the current keyboard row and column location. Alternatively, as discussed above, the LED could be flashed intermittently or some other technique which would be readily apparent to one of ordinary skill in the art could be utilized to indicate to the user which row and column location is the current row and column location and is thus available for selection through activation of the input device.

Having indicated the accessibility of the current row and column location to the user in step 20, the system then waits (in steps 21 and 22) to see if the user activates the input device prior to the expiration of the predetermined time window available for the selection of the current row and column location as determined by the scan step timer which was started in step 19. If the end of this time window is reached with no switch activation being detected, the system proceeds to step 23 and cancels the increased power that was sent in step 20 to the LED of the current keyboard row and column location. This returns the LEDs of the keyboard to the state established in step 5. Having done so, the system returns to step 17 and continues from there as before.

However, if the system does detect a switch activation at step 21 prior to the expiration of the pre-determined time window, the system then proceeds to step 24 having established the selection of the current row and column location by the user. In step 24, the system determines the symbol associated with the selected key location. Then in step 25, the system adds the determined symbol to the sequence of previously determined symbols (temporarily stored in the icon buffer) at the current position of the icon cursor. In step 26, the system compares the temporarily stored symbol sequence in the icon buffer with the plurality of stored symbol sequences in memory so that it can determine in step 27 whether the temporarily stored symbol sequence exactly matches any of the stored symbol sequences in memory. If there is an exact match found, the system proceeds to step 28 and accesses the stored plural word message associated with the corresponding stored symbol sequence in memory and then in step 29 the system processes the stored plural word message as appropriate. Following this processing, or alternatively simultaneously with such processing, the system returns to the start and repeats the entire procedure. However, if in step 27 the system determines that the temporarily stored symbol sequence does not exactly match any of the stored symbol sequences in memory, the system returns to step 2 and proceeds from there as before.

This procedure may be modified in ways which would be obvious to one of ordinary skill in the art, such as waiting for an initial switch activation prior to step 1 to allow the user to initiate the scanning process, and limiting the number of times (for example, three) that the system proceeds from step 9 to step 6 with no intervening switch activation, and returning to the start to wait for an initiating switch activation before resuming the scanning process. This modification, for example, would automatically stop the system from scanning after scanning through all of the rows three times without any selection made by the user to prevent the system from becoming an unwanted distraction when no selection is desired by the user.

FIGS. 9a-9b show a flowchart of the process for direct selection using icon prediction for the specific example of direct physical activation of keys. The system begins at step 1 by initializing the temporarily stored symbol sequence in the icon buffer to the null sequence (empty), with the icon cursor necessarily located at the start of the icon buffer. In step 2, the system compares the temporarily stored symbol sequence in the icon buffer with the plurality of stored symbol sequences in memory. This is also the step to which the system returns after failing to find an exact match for the temporarily stored sequence in the icon buffer with any of the stored sequences in memory in step 11. Then in step 3, the system determines from the comparison in step 2 which of the plurality of stored symbol sequences in memory can match the symbol sequence prefix and suffix determined by the contents of the icon buffer and the position of the icon cursor in the buffer. This enables the system in step 4 to determine the set of icons which occur in the matching sequences corresponding to the position of the icon cursor (following the icons of the determined prefix in the matching sequences identified in step 3). These are the icons regarded as being "valid" for the purposes of icon prediction. In step 5, the system determines the row and column locations of the keys which correspond to any of the set of valid icons determined in step 4. At this time, the system outputs a predetermined level of power to the LEDs at each of these locations. The system is ready at this point to wait for the user to select and activate the next desired key and the system detects this next key activation in step 6.

In a preferred embodiment in which an auditory feedback prompt is to be provided to the system operator when directly activating keys, in step 6 this auditory prompt would be spoken over the private audio feedback channel as described previously. This previously described method would then be used to determine whether or not the physical activation of a key by the user would actually result in a key activation to which the system would actually respond and which would result in the activation of the associated icon.

In step 7, the system determines whether the activated key location is one of the set of valid keys identified in step 5. If not, the system simply returns to step 6 to await the next key activation by the user. Alternatively, the system may be configured for automatic mode selection so that the activation of a key that is not a valid key in the iconic mode, but which is a valid key in spelling mode and where all the keys corresponding to icons which are currently stored in the icon buffer also correspond to keys which are valid keys in spelling mode, may automatically trigger the system to switch from the iconic mode to the spelling mode and re-interpret the corresponding keys in spelling mode. The procedure of automatic mode switching is discussed in detail in copending application Ser. No. 07/536,022, which is incorporated herein by reference. In another preferred embodiment in which the input device 16 consists of a remote pointing device (such as the "Headmaster", for example), the key activation indicated by the signals received from the input device 16 could simply be ignored.

In the case where it is determined that the activated key does indeed correspond to a valid key, in step 8 the system determines the symbol corresponding to the key activated. Then in step 9, the system adds the determined symbol to the sequence of previously determined symbols (temporarily stored in the icon buffer) at the current position of the icon cursor. In step 10, the system compares the temporarily stored symbol sequence in the icon buffer with the plurality of stored symbol sequences in memory so that it can determine in step 11 whether the temporarily stored symbol sequence exactly matches any of the stored symbol sequences in memory. If there is an exact match found, the system proceeds to step 12 and accesses the stored plural word message associated with the corresponding stored symbol sequence in memory and then in step 13 the system processes the stored plural word message as appropriate. Following this processing, or alternatively simultaneously with such processing, the system returns to the start and repeats the entire procedure. However, if in step 11 the system determines that the temporarily stored symbol sequence does not exactly match any of the stored symbol sequences in memory, the system returns to step 2 and proceeds from there as before.

This procedure may be modified in ways which would be obvious to one of ordinary skill in the art, such as waiting for an initial key activation prior to step 1 to allow the system to turn off all power to the LEDs in order to conserve power and extend battery life. The system could, for example, turn off all power to the LEDs after a pre-determined time period had elapsed during which no keys had been activated. The first key activation might then, for example, be ignored and simply serve to re-activate the power supplied to LEDs located on those keys which are currently valid with respect to the contents of the icon buffer. Alternatively, this key activation might be accepted if it corresponded to a valid key. Such modifications, for example, would tend to conserve battery power that might otherwise be expended in maintaining power supplied to the LEDs during periods in which the system was not actually being used by the system operator. These and other such modifications would be obvious to one of ordinary skill in the art.

In the preferred embodiments described above, icon prediction is invoked to define valid icons, in an exemplary fashion, only after the activation of an initial key and the determination of the associated initial symbol. This initially detected symbol is temporarily stored in an icon buffer which is large enough to hold a sequence of icons as long as the maximum length icon sequence to be allowed by the system (for example, 8 icons). At that time, the symbol sequences stored in memory are searched to find all symbol sequences that begin with the detected symbol. Then, all icons which occur in such sequences as the immediate successor to the detected symbol (symbol immediately following the detected symbol in at least one of the plurality of symbol sequences containing the detected symbol as a first symbol) are defined as valid icons for the purposes of icon prediction. In the case where the user activates one or more subsequent icons such that a sequence of two or more detected icons has been temporarily stored in the icon buffer in the order in which they were activated by the user, this icon buffer sequence is regarded as a prefix which determines which stored symbol sequences in memory 6 can potentially be retrieved. Then, the symbol sequences stored in memory 6 are searched to find all symbol sequences that begin with the same symbol sequence prefix temporarily stored in the icon buffer. All icons which occur in such sequences as the immediate successor to the detected symbol sequence prefix (symbols immediately following the next detected symbol in at least one of the plurality of symbol sequences containing the detected symbol and the previously detected symbol as a first and second symbol of the sequence) are then defined as valid icons for the purposes of icon prediction. The first case described above is simply the special instance in which the symbol sequence prefix in the icon buffer is of length one, a single icon.

In an alternative embodiment of the icon prediction process, this procedure may be further generalized to the special instance in which the symbol sequence prefix in the icon buffer is of length zero, or empty. This would be the case prior to the detection of the first key activation and the determination of the associated symbol and subsequent to system activation, turning the ON switch. In this case, we have a null-length symbol sequence prefix. All symbol sequences stored in memory 6 can be regarded as having a null-length symbol sequence prefix prior to the first actual symbol in each sequence. In this state, prior to the activation of the first symbol by the user, all icons which occur in any sequence as the first icon in at least one of the plurality of symbol sequences are then defined as valid icons for the purposes of icon prediction. Thus, icon prediction can be invoked to establish a limited set of valid icons consisting of all icons which occur as the first icon in any stored symbol sequence in memory 6 prior to the activation of a first icon. Likewise, following the activation of an indicator for a key corresponding to an icon which exactly matches a symbol sequence stored in memory 6 and the consequent retrieval of its associated plural word message, the next icon activation can be regarded as initiating a new symbol sequence in the icon buffer (which will be cleared out on the detection of a next symbol activation prior to temporarily storing the newly detected symbol in the icon buffer). Thus, once an icon sequence has been successfully retrieved from memory 6, the limited set of valid icons would once again be defined as those icons which occur as the first icon in any stored symbol sequence in memory 6.

In another preferred embodiment of the icon prediction process, the icon buffer may be regarded as having an icon cursor which marks the position in the icon buffer where subsequently activated icons are to be inserted. Special functions are added to the system to allow deliberate manipulation of the position of the icon cursor in the icon buffer. These functions can be invoked directly by the user, or can be stored as part of plural word messages and be invoked automatically when these messages are retrieved by the user.

For example, and for purposes of explication, let us assume the icon buffer is displayed from left to right, with the first detected symbol displayed at the far left, and proceeding to the right with the last detected symbol at the far right. Note that the embodiments previously described can be regarded as a special case in which such icon cursor manipulation functions are never invoked, and the icon cursor is always positioned at the far right of the icon buffer, following the last detected symbol. In this state, when the function to move the icon cursor to the left is invoked, and the icon buffer is non-empty, the icon cursor moves one symbol to the left and appears in the buffer prior the last symbol detected, but following to the right of any other previously detected symbols in the icon buffer. When a subsequent symbol activation is then detected by the system, it will be inserted into the icon buffer at the position of the icon cursor appearing to the left of the final icon displayed at the far right, and following all other previously detected symbols in the icon buffer.

Now the icon buffer contents together with the icon cursor position can be regarded as determining two logical entities: an icon sequence prefix consisting of all icons present in the buffer up to the position of the icon cursor, and an icon sequence suffix consisting of all icons present in the buffer following the position of the icon cursor. Either or both of the suffix and prefix may be regarded as being null-length. As with the prefixes, all symbol sequences stored in memory 6 can be regarded as having a null-length symbol sequence suffix following the last actual symbol in each sequence.

In this embodiment, the icon prediction process consists of searching all of the sequences stored in the memory 6 to determine which sequences begin with the prefix currently determined by the state of the icon buffer and cursor, and end with the suffix so determined. Valid icons are then defined as all icons which occur in such sequences as the immediate successor to the determined sequence prefix for the purposes of icon prediction. Such icons, when inserted in the icon buffer at the position of the icon cursor, will determine sequences in the icon buffer which actually correspond to symbol sequences sorted in the memory 6. As before, when a stored symbol sequence in memory 6 exactly matches the complete contents of the icon buffer (irrespective of the position of the icon cursor), and no other sequence exists in memory 6 which also matches the currently determined prefix and suffix, the plural word sequence associated with the matching stored symbol sequence is retrieved from memory 6.

In all of the above embodiments for predictive scanning or direct selection, any of the embodiments here described for the icon prediction process may be utilized to determine which icons are valid at any point in the symbol sequence entry procedure. The chosen terminology is as follows: the process of identifying which stored symbol sequences match the prefix determined by the icon buffer and cursor is referred to as forward icon prediction. The process of identifying which stored symbol sequences match the suffix determined by the icon buffer and cursor is referred to as backward icon prediction, wherein preceding, not following icons are deemed valid. Icon prediction thus identifies the intersection of the set of symbol sequences determined by forward icon prediction and the set of symbol sequences determined by backward icon prediction.

Another preferred embodiment involves the ability to insert markers into stored plural word messages indicating when they are retrieved that there is a "blank" at that position to be filled in by subsequent activations prior to that message (with the blank or blanks filled in) being sent to specialized processor 10 to be spoken or otherwise output from the system. Such inserted blanks in plural word messages can be effectively combined with other functions also embedded in the plural word message which manipulate the icon buffer and cursor to achieve a new effect utilizing icon prediction. Such functions could, for example, include the following: delete all icons from the icon buffer (establishing a known state); insert a particular icon at the current position of the icon cursor; and move the position of the icon cursor in the buffer. By the use of such blanks and functions, upon retrieval of the plural word message containing them, icon prediction can be automatically invoked to simplify the retrieval of appropriate plural word messages in a manner similar to that described previously, to fill in each occurring blank based on the underlying paradigmatic structure chosen for the stored symbol sequences and associated plural word messages. Thus, one accessed plural word message can be used to access and determine valid icons corresponding to icon sequences of a submessage. The submessage, when accessed, can then be combined with the original plural word message, and a complete message can be output.

In one example, all of the names of people stored in the vocabulary have been stored under icon sequences that begin with NAME (the "John Hancock" icon) and end with NOUN. The system can be set up such that when the base frame sentence is recalled (the first plural word message accessed), the icons NAME and NOUN are automatically inserted in the icon buffer with the icon cursor positioned between them. Then all the system operator needs to do to complete the sentence to greet a specific individual is to activate only the icon or icons in the sequence prediction in operation, only those icons which are used to designate people's names (the submessage) would be predicted in that context. In this case, only three of four keystrokes would be needed to greet an individual by name.

Another potentially powerful application of this mechanism would be with lower functioning individuals. This approach would make it possible to embed a relatively complex underlying vocabulary structure with a 32-location or even an 8-location overlay. The system would be simple to use and would not appear complex to the system operator, since it would only be necessary to make one or two hits to bring up one of the frame sentences within a given theme, and then one additional hit to fill in the blanks. Since icon prediction would be operative both when choosing a frame sentence and when filling each blank, the cognitive demands on the system operator would presumably be quite limited. The sentences and underlying vocabulary would be structured so that only a manageable number of alternatives would be predicted for each blank, each of which would be a sensible, meaningful choice in that context.

Another preferred embodiment is related to the use of Dependent Icons. The term "Dependent Icons" refers to a feature which is designed to enhance the operation of word-based vocabularies such as the Words Strategy ™ Minspeak ™ Application Program (MAP) which include sets of closely related icons such as the grammatical labels NOUN, NOUN PL., A+NOUN, THE+NOUN, and THE+NOUN PL. This feature provides two benefits: it reduces the amount of memory required to store the MAP's vocabulary, and it simplifies the addition of new vocabulary by the system operator which adheres to the icon sequence selection paradigm of the MAP. As an example, consider the word "part" which is stored under the two icon sequence SHAKESPEARE - NOUN. Without such a feature, the other possible forms ("parts," "a part", "the part", and "the parts") must all be stored under their respective sequences, requiring additional storage space amounting to almost five times that required for the single word "part". Furthermore, suppose the system operator wanted to add the word "piece" to his or her vocabulary. In order to be consistent with the overall scheme of the MAP, it would also be necessary to separately store the words "pieces", "a piece", etc. under their respective sequences.

This situation is significantly improved by designating NOUN PL., A+NOUN, THE+NOUN, and THE+NOUN PL. as dependent icons, each of which "depends" on the icon NOUN. A dependent icon functions as follows (we will take SHAKESPEARE - THE+NOUN PL. as an example): When the dependent icon is activated, the vocabulary data base is first searched to see if there is in fact an items stored under that sequence. If so, it is simply retrieved in the usual fashion. This enables the system to handle words which may have irregular forms (e.g. mouse - mice). If no entry is found (as would be the case with "part"), the dependent icon THE+NOUN PL. is replaced with the icon NOUN upon which it depends, and the vocabulary data base is again searched, this time coming up with the singular form "part" (words are stored with a following space). Each dependent icon is also associated with a simple series of editing rules. In this case, the rules would be: type the word "the", then insert the retrieved text "part", delete the final space and add the letter 's' and a following space. It would be easy to add some conditional editing operations to handle rule-following "exceptions" such as copy/copies and glass/glasses, so that only truly irregular forms such as "mice" would need to be explicitly stored. Furthermore, when the system operator adds the word "piece" to the vocabulary under a sequence ending with NOUN, all of the other corresponding forms are available under their respective sequences. The same approach would work for the group ADJECT., ADJECT+ER, and ADJECT.+EST and for VERB, VERB+S, VERB+ED, VERB+ING, VERB+EN, and TO+VERB.

There are some implications of such a Dependent Icon feature for the functioning of the basic icon prediction procedure. One is that whenever the result of the comparison of the contents of the icon buffer with the symbol sequences sorted in memory indicates that an icon is valid which is activated by one or more Dependent icons (i.e., the icon upon which the Dependent icons depend is a valid icon), then each of those Dependent icons which depend upon the valid icon must also be regarded as being valid in the current context. A second implication arises when a Dependent icon has been selected and is present in the temporarily stored icon buffer. In this case, following the usual comparison of the contents of the icon buffer with the symbol sequences stored in memory to determine the set of valid icons, a second comparison must also be performed using the same contents of the icon buffer but with the Dependent icon replaced by the icon upon which it depends. Then the actual set of valid icons is the union of the two sets of valid icons identified by both the first and second comparisons. Similarly, these same processes would be re-iterated in cases involving second-order dependency, in which the target icon activated by one or more Dependent icons is itself a Dependent icon depending on a third icon. The same would be true for further higher-order dependencies.

From the above-described embodiments of the present invention, it is apparent that the present invention may be modified as would occur to one of ordinary skill in the art without departing from the spirit and scope of the present invention which should be defined solely by the appendant claims. Changes and modifications of this system contemplated by the present preferred embodiments will be apparent to one of ordinary skill in the art.

We claim:

1. A predictive scanning input system for predictive selection of indicators corresponding to keys on a keyboard, each key corresponding to one of a plurality of symbols, comprising:

detecting means for detecting activation of a first of a plurality of keys on said keyboard and for detecting a first symbol corresponding to said activated key;

memory means for storing a plurality of symbol sequences, each including a plurality of symbols, each symbol corresponding to one of a plurality of keys on the keyboard, said memory means further storing a message, one message corresponding to each of said plurality of symbol sequences;

comparison means, operatively connected to said detecting means and said memory means, for comparing the detected first symbol to said plurality of symbol sequences stored in said memory means, determining which of said plurality of symbol sequences begin with said detected first symbol, determining second symbols as being symbols of those symbol sequences beginning with the detected first symbol which immediately follow the detected first symbol, and determining which of said plurality of keys correspond to each second symbol; and indicator activation means, operatively connected to said comparison means, for activating an indicator for each of said plurality of keys determined to correspond to each of said second symbols to thereby define a limited number of second symbol keys for subsequent activation in producing a stored message of a symbol sequence beginning with the detected first symbol.

2. The system of claim 1, wherein said system is used as an input system for a voice synthesization system.

3. The system of claim 2, wherein said plurality of symbols on said keys include icons.

4. The predictive scanning input system of claim 1, wherein the detection means further detects subsequent activation of one of the defined limited number of second symbol keys and detects the second symbol corresponding to the subsequently activated key, the comparison means compares the detected second symbol to the plurality of symbol sequences sequentially containing the previously detected first symbol, determines which of the plurality of symbol sequences contain the detected second symbol as a next sequential symbol, determines third symbols as being symbols of those symbol sequences containing the detected second symbol as a next sequential symbol which immediately follow the detected second symbol, and determines which of the plurality keys correspond to each third symbol, and the indicator activator means activates an indicator for each of the plurality of keys determined to correspond to each of the third symbols to thereby define a limited number of third symbol keys for subsequent activation.

5. The predictive scanning input system of claim 1, wherein the comparison means, compares each detected symbol to the plurality of symbol sequences sequentially containing each of the previously detected symbols, and upon determining that a detected symbol ends a symbol sequence, the comparison means accesses the memory means for the corresponding prestored message.

6. The predictive scanning input system of claim 5 further comprising:
output means, operatively connected to the comparison means and the memory means, for outputting the corresponding prestored message.

7. The system of claim 3, wherein said icons are polysemic pictorial illustrations related and corresponding to messages to be retrieved from memory.

8. The system of claim 6, wherein the output means is a voice synthesizer and upon accessing a prestored message, said message is processed and output as a voice message from said voice synthesizer.

9. The system of claim 3, wherein said plurality of symbols on said keys include symbols corresponding to parts of speech.

10. The system of claim 1, wherein said indicator activation means includes:
means for sequentially and alternatingly accessing each of a plurality of keys, arranged in parallel rows in a first direction and in parallel columns in a second direction perpendicular to the first direction, on said keyboard, to which said indicators correspond, and thereby sequentially activating each of said indicators for said plurality of keys determined to correspond to each of said second symbols.

11. The system of claim 10, further comprising:
input means for activating one of said accessed keys corresponding to one of an activated indicator, to thereby allow further predictive scanning.

12. The predictive scanning input system of claim 11, wherein the detection means further detects subsequent activation of one of the defined limited number of second symbol keys and detects the symbol corresponding to the subsequently activated key,
the comparison means compares the detected second symbol to the plurality of symbol sequences sequentially containing the previously detected first symbol, determines which of the plurality of symbol sequences contain the detected second symbol as a next sequential symbol, determines third symbols as being symbols of those symbol sequences containing the detected second symbol as a next sequential symbol which immediately follow the detected second symbol, and determines which of the plurality of keys correspond to each third symbol, and
the indicator activator means activates an indicator for each of the plurality of keys determined to correspond to each of the third symbols in a row-column sequential manner to thereby define a limited number of third symbol keys for subsequent activation.

13. The predictive scanning input system of claim 12, wherein the comparison means, compares a detected third symbol to the plurality of symbol sequences sequentially containing previously detected first and second symbols, and upon determining that the detected third symbol ends symbol sequence, the comparison means accesses the memory means for the corresponding prestored message.

14. The predictive scanning input system of claim 13 further comprising:

output means, operatively connected to the comparison means and the memory means, for outputting the corresponding prestored message.

15. The system of claim 13, wherein each said indicator includes an audible indicator.

16. The system of claim wherein each said indicator includes an audible indicator.

17. The system of claim 14, wherein said plurality of symbols on said keys include icons which are polysemic pictorial illustrations.

18. The system of claim 13, wherein each said indicator includes at least one of a visual indicator and an audible indicator.

19. The system of claim 1, wherein each said indicator includes at least one of a visual indicator and an audible indicator.

20. A predictive scanning input system for predictive selection of indicators corresponding to keys on a keyboard, each key corresponding to one of a plurality of symbols, comprising:
detecting means for detecting activation of the system;
memory means for storing a plurality of symbol sequences, each including a plurality of symbols, each symbol corresponding to one of a plurality of keys on a keyboard, said memory means further storing a message, one message corresponding to each of said plurality of symbol sequences;
determination means, operatively connected to said detecting means and said memory means, for determining which symbols are first symbols which begin at least one of said plurality of symbol sequences stored in said memory means, upon detecting activation of the system, and for determining which of the plurality of keys correspond to each of the first symbols which begin at least one of the plurality of symbol sequences; and
indicator activation means, operatively connected to said determination means, for activating an indicator for each of said plurality of keys determined to correspond to each of said first symbols which begin at least one of said symbol sequences to thereby define a limited number of first symbol keys for subsequent activation.

21. The predictive scanning input system of claim 20, wherein the detecting means further detects activation of one of the defined limited number of first symbol keys and detects the symbol corresponding to the activated key,
the determination means compares the detected first symbol to the plurality of symbol sequences stored in said memory means, determines which of the plurality of symbol sequences begin with the detected first symbol, determines second symbols as being symbols immediately following the detected first symbol in symbol sequences beginning with the detected first symbol, and determines which of said plurality of keys correspond to each second symbol,
the indicator activation means activates an indicator for each of the plurality of keys determined to correspond to each of said second symbols to thereby define a limited number of second symbol keys for subsequent activation.

22. The predictive scanning input system of claim 21, wherein the detection means further detects subsequent activation of one of the defined limited number of second symbol keys and detects the second symbol corresponding to the subsequently activated key, the determination means compares the detected second symbol to the plurality of symbol sequences sequentially containing the previously detected first symbol, determines which of the plurality of symbol sequences contain the detected second symbol as a next sequential symbol, determines third symbols as being symbols of those symbol sequences containing the detected second symbol as a next sequential symbol which immediately follow the detected second symbol, and determines which of the plurality of keys correspond to each third symbol, and the indicator activation means activates an indicator for each of the plurality of keys determined to correspond to each of the third symbols to thereby define a limited number of third symbol keys for subsequent activation.

23. The predictive scanning input system of claim 22, wherein the determination means compares each detected symbol to the plurality of symbol sequences sequentially containing each of the previously detected symbols, and upon determining that a detected symbol ends a symbol sequence, the determination means accesses the memory means for the corresponding prestored message.

24. The predictive scanning input system of claim 23 further comprising:

output means, operatively connected to the determination means and the memory means, for outputting the corresponding prestored message.

25. The system of claim 20, wherein said system is used as input system for a voice synthesization system.

26. The system of claim 25, wherein said plurality of symbols on said keys include icons.

27. The system of claim 20, wherein said indicator activation means includes:

means for sequentially and alternatingly accessing each of a plurality of keys, arranged in parallel rows in a first direction and in parallel columns in a second direction perpendicular to the first direction on said keyboard, to which said indicators correspond, and thereby sequentially activating each of said indicators for said plurality of keys determined to correspond to each of said first symbols.

28. The system of claim 27, further comprising:

input means for activating one of said accessed keys corresponding to one of an activated indicator, to thereby allow further predictive scanning.

29. The predictive scanning input system of claim 27, wherein the detection means further detects subsequent activation of one of the defined limited number of first symbol keys and detects the symbol corresponding to the subsequently activated key, the determination means compares the detected first symbol to the plurality of symbol sequences sequentially containing the previously detected first symbol, determines which of the plurality of symbol sequences contain the detected first symbol as a beginning symbol, determines second symbols as being symbols of those symbol sequences containing the detected first symbol as a beginning symbol which immediately follow the detected first symbol, and determines which of the plurality of keys correspond to each second symbol, and the indicator activation means activates an indicator for each of the plurality of keys determined to correspond to each of the second symbols in a row-column sequential manner to thereby define a limited number of second symbol keys for subsequent activation.

30. The predictive scanning input system of claim 29, wherein the determination means, compares each detected second symbol to the plurality of symbol sequences sequentially containing the previously detected first symbol, and upon determining that the detected second symbol ends a symbol sequence, the determination means accesses the memory means for the corresponding prestored message.

31. The predictive scanning input system of claim 30 further comprising:

output means, operatively connected to the determination means and the memory means, for outputting the corresponding prestored message.

32. The system of claim 20, wherein each said indicator includes at least one of an audible indicator and a visual indicator.

33. The system of claim 31, wherein each said indicator includes at least one of an audible indicator and a visual indicator.

34. A predictive scanning input system for predictive selection of indicators corresponding to keys on a keyboard, each key corresponding to one of a plurality of symbols, comprising:

detecting means for detecting activation of the system;

memory means for storing a plurality of symbol sequences, each including a plurality of symbols, each symbol corresponding to one of a plurality of keys on keyboard, said memory means further storing a message, one message corresponding to each of said plurality of symbol sequences;

determination means, operatively connected to said detecting means and said memory means, for determining which symbols are last symbols which end at least one of said plurality of symbol sequences stored in said memory means, upon detecting activation of the system, and for determining which of the plurality of keys correspond to each of the last symbols which end at least one of the plurality of symbol sequences; and indicator activation means, operatively connected to said determination means, for activating an indicator for each of said plurality of keys determined to correspond to each of said last symbols which end at least one of said symbol sequences to thereby define a limited number of last symbol keys for subsequent activation.

35. The predictive scanning input system of claim 34, wherein the detecting means further detects activation of one of the defined limited number of last symbol keys and detects the symbol corresponding to the activated key, the determination means compares the detected last symbol to the plurality of symbol sequences stored in said memory means, determines which of the plurality of symbol sequences end with the detected last symbol, determines second to last symbols as being symbols immediately preceding the detected last symbol in symbol sequences ending with the detected last symbol, and determines which of said plurality of keys correspond to each second to last symbol, the indicator activation means activates an indicator for each of the plurality of keys determined to correspond to each of said second to last symbols to thereby define a limited number of second to last symbol keys for subsequent selection.

36. The predictive scanning input system of claim 35, wherein the detection means further detects subsequent activation of one of the defined limited number of second to last symbol keys and detects the second to last symbol corresponding to the subsequently activated key, the determination means compares the detected second to last symbol to the plurality of symbol sequences sequentially containing the previously detected last symbol, determines which of the last plurality of symbol sequences contain the detected second to last symbol as a next preceding symbol, determines third to last symbols as being symbols of those symbol sequences containing the detected second to last symbol as a next preceding symbol which immediately precedes the detected second to last symbol, and determines which of the plurality of keys correspond to each third to last symbol, and the indicator activation means activates an indicator for each of the plurality of keys determined to correspond to each of the third to last symbols to thereby define a limited number of third to last symbol keys for subsequent activation.

37. The predictive scanning input system of claim 36, wherein the determination means, compares a detected symbol to the plurality of symbol sequences sequentially containing each of the previously detected symbols, and upon determining that a detected symbol begins a symbol sequence, the determination means accesses the memory means for the corresponding prestored message.

38. The predictive scanning input system of claim 37, further comprising:

output means, operatively connected to the determination means and the memory means, for outputting the corresponding prestored message.

39. The system of claim 34, wherein said system is used as input system for a voice synthesization system.

40. The system of claim 39, wherein said plurality of symbols on said keys include icons.

41. The system of claim 34, wherein said indicator activation means includes:

means for sequentially and alternatingly accessing each of a plurality of keys, arranged in parallel rows in a first direction and in parallel columns in a second direction perpendicular to the first direction on said keyboard, to which said indicators correspond, and thereby sequentially activating each of said indicators for said plurality of keys determined to correspond to each of said last symbols.

42. The system of claim 41, further comprising:

input means for activating one of said accessed keys corresponding to one of an activated indicator, to thereby allow further predictive scanning.

43. The predictive scanning input system of claim 41, wherein the detection means further detects subsequent activation of one of the defined limited number of last symbol keys and detects the symbol corresponding to the subsequently activated key, the determination means compares the detected last symbol to the plurality of symbol sequences sequentially containing the previously detected last symbol, determines which of the plurality of symbol sequences contain the detected last symbol as an ending symbol, determines second to last as being symbols of those symbols sequences containing the detected last symbol as an ending symbol which immediately precedes the detected last symbol, and determines which of the plurality of keys correspond to each second to last symbol, and the indicator activator means activates an indicator for each of the plurality of keys determined to correspond to each of the second to last symbols to thereby define a limited number of second to last symbol keys for subsequent activation.

44. The predictive scanning input system of claim 43, wherein the determination means, compares each detected second to last symbol to the plurality of symbol sequences sequentially containing the previously detected last symbol, and upon determining that the detected second to last symbol beings a symbol sequence, the determination means accesses the memory means for the corresponding prestored message.

45. The predictive scanning input system of claim 44 further comprising:

output means, operatively connected to the determination means and the memory means, for outputting the corresponding prestored message.

46. The system of claim 34, wherein each said indicator includes at least one of an audible indicator and a visual indicator.

47. The system of claim 45, wherein each said indicator includes at least one of an audible indicator and a visual indicator.

48. A method of predictive input scanning for predictive selection of indicators corresponding to keys on a keyboard, each key corresponding to one of a plurality of symbols, comprising:

(a) detecting activation of the system;

(b) storing a plurality of symbol sequences, each including a plurality of symbols, each symbol corresponding to one of a plurality of keys on the keyboard, and further storing a message, one message corresponding to each of said plurality of symbol sequences;

(c) determining which symbols are first symbols which being at least one of the plurality of stored symbol sequences, upon detecting activation of the system, and determining which of the plurality of keys correspond to each of the first symbols which begin at least one of the plurality of symbol sequences; and (d) activating an indicator for each of the plurality of keys determined to correspond to each of the first symbols which begin at least one of the plurality of symbol sequences to thereby define a limited number of first symbol keys for subsequent activation.

49. The method of claim 48, further comprising the steps of:

(e) detecting activation of one of the defined limited number of first symbol keys and detecting the symbol corresponding to the activated key;

(f) comparing the detected first symbol to the plurality of stored symbol sequences to determine which of the plurality of symbol sequences begin with the detected first symbol, determining second symbols as being symbols immediately following the detected first symbol in symbol sequences beginning with the detected first symbol, and determining which of the plurality of keys correspond to each second symbol; and (g) activating an indicator for each of the plurality of keys determined to correspond to each of the second symbols to thereby define a limited number of second symbol keys for subsequent activation.

50. The method of claim 49, further comprising the steps of:

(h) detecting subsequent activation of one of the defined limited number of second symbol keys and detecting the second symbol corresponding to the subsequently activated key;

(i) comparing the detected second symbol to the plurality of symbol sequences sequentially containing the previously detected first symbol, determining which of the plurality of symbol sequences contain the detected second symbol as a next sequential symbol, determining third symbols as being symbols of those symbol sequences containing the detected second symbol as a next sequential symbol which immediately follow the detected second symbol, and determining which of the plurality of keys correspond to each third symbol; and p1 (j) activating an indicator for each of the plurality of keys determined to correspond to each of the third symbols to thereby define a limited number of third symbol keys for subsequent activation.

51. The method of claim 50, further comprising the steps of:

(k) repeating steps (h)–(j), until a next sequential symbol cannot be determined in step (i) for any stored symbol sequence, thereby determining that the most recently detected symbol ends a symbol sequence; and (l) outputting a stored message corresponding to the stored symbol sequence which contains the most recently detected symbol as an end symbol in a symbol sequence.

52. The method of claim 48, wherein at least one of an audible and a visual indicator is activated in step (d).

53. The method of claim 51, wherein at least one of an audible and a visual indicator is activated in each of steps (g), (j) and (k).

54. The method of claim 51, wherein the stored message is output as a voice synthesized message in step (l).

55. The method of claim 48, wherein step (d) occurs by sequential and alternate accessing each of a plurality of keys, arranged in parallel rows in a first direction and in parallel columns in a second direction perpendicular to the first direction, of the keyboard, to which said indicators correspond, and thereby sequentially row-column activating each of the indicators for each of the plurality of keys corresponding to the first symbols determined to begin at least one of the plurality of symbol sequences.

56. The method of claim 49, wherein step (g) occurs by sequential and alternate accessing of a plurality of keys, arranged in parallel rows in a first direction and in parallel columns in a second direction perpendicular to the first direction, of the keyboard, to which said indicators correspond, and thereby sequentially row-column activating each of the indicators for each of the plurality of keys corresponding to each of the second symbols.

57. The method of claim 51, wherein step (j) occurs by sequential and alternate accessing of a plurality of keys, arranged in parallel rows in a first direction and in parallel columns in a second direction perpendicular to the first direction, of the keyboard, to which said indicators correspond, and thereby sequentially row-column activating each of the indicators for each of the plurality of keys corresponding to each of the third symbols.

58. The method of claim 55, wherein at least one of an audible and a visual indicator is activated in step (d).

59. The method of claim 56, wherein at least one of an audible and a visual indicator is activated in step (g).

60. The method of claim 57, wherein at least one of an audible and a visual indicator is activated in step (j).

61. A method of predictive input scanning for predictive selection of indicators corresponding to keys on a keyboard, each key corresponding to one of a plurality of symbols, comprising:

(a) detecting activation of the system;

(b) storing a plurality of symbol sequences, each including a plurality of symbols, each symbol corresponding to one of a plurality of keys on the keyboard, and further storing a message, one message corresponding to each of said plurality of symbol sequences;

(c) determining which symbols are last symbols which end at least one of the plurality of stored symbol sequences, upon detecting activation of the system, and for determining which of the plurality of keys correspond to each of the last symbols which end at least one of the plurality of symbol sequences; and (d) activating an indicator for each of the plurality of keys determined to correspond to each of said last symbols which end at least one of the plurality of symbol sequences to thereby define a limited number of last symbol keys for subsequent activation.

62. The method of claim 61, further comprising the steps of:

(e) detecting activation of one of the defined limited number of last symbol keys and detecting the symbol corresponding to the activated key;

(f) comparing the detected last symbol to the plurality of stored symbol sequences to determine which of the plurality of symbol sequences end with the detected last symbol, determining second to last symbols as being symbols immediately preceding the detected last symbol in symbol sequences ending with the detected last symbol, and determining which of the plurality of keys correspond to each second to last symbol; and (g) activating an indicator for each of the plurality of keys determined to correspond to each of the second to last symbols to thereby define a limited number of second to last symbol keys for subsequent activation.

63. The method of claim 62, further comprising the steps of:

(h) detecting subsequent activation of one of the defined limited number of second to last symbol keys and detecting the second to last symbol corresponding to the subsequently activated key;

(i) comparing the detected second to last symbol to the plurality of symbol sequences sequentially containing the previously detected last symbol, determining which of the plurality of symbol sequences contain the detected second to last symbol as a next preceding symbol, determining third to last symbols as being symbols of those symbol sequences containing the detected second to last symbol as a next preceding symbol which immediately proceeds the detected second to last symbol, and determining which of the plurality of keys correspond to each third to last symbol; and (j) activating an indicator for each of the plurality of keys determined to correspond to each of the third to last symbols to thereby define a limited number of third to last symbol keys for subsequent activation.

64. The method of claim 63, further comprising the steps of:

(k) repeating steps (h)–(j), until a next immediately preceding symbol cannot be determined in step (i) for any stored symbol sequence, thereby determining that the most recently detected symbol begins a symbol sequence; and (l) outputting a stored message corresponding to the stored symbol sequence which contains the most recently detected symbol as a beginning symbol in a symbol sequence.

65. The method of claim 61, wherein at least one of an audible and a visual indicator is activated in step (d).

66. The method of claim 64, wherein at least one of an audible and a visual indicator is activated in each of steps (g), (j) and (k).

67. The method of claim 64, wherein the stored message is output as a voice synthesized message in step (l).

68. The method of claim 61, wherein step (d) occurs by sequential and alternate accessing of each of a plurality of keys, arranged in parallel rows in a first direction and in parallel columns in a second direction perpendicular to the first direction, of the keyboard, to which said indicators correspond, and thereby sequentially row-column activating each of the indicators for each of the plurality of keys corresponding to the last symbols determined to end at least one of the plurality of symbol sequences.

69. The method of claim 62, wherein step (g) occurs by sequential and alternate accessing of a plurality of keys, arranged in parallel rows in a first direction and in parallel columns in a second direction perpendicular to the first direction, of the keyboard, to which said indicators correspond, and thereby sequentially row-column activating each of the indicators for each of the plurality of keys corresponding to each of the second to last symbols.

70. The method of claim 64, wherein step (j) occurs by sequential and alternate accessing of a plurality of keys, arranged in parallel rows in a first direction and in parallel columns in a second direction perpendicular to the first direction, of the keyboard, to which said indicators correspond, and thereby sequentially row-column activating each of the indicators for each of the plurality of keys corresponding to each of the third to last symbols.

71. The method of claim 68, wherein at least one of an audible and visual indicator is activate din step (d).

72. The method of claim 69, wherein at least one of an audible and a visual indicator is activated in step (g).

73. The method of claim 70, wherein at least one of an audible and a visual indicator is activated in step (j).

74. The predictive scanning input system of claim 23, wherein the determination means, upon accessing the corresponding prestored message, determines which symbols are first symbols which begin at least one of a plurality of prestored symbol sequences corresponding to the accessed prestored message, and determines which of the plurality of keys correspond to each of the first symbols which begin at least one of the plurality of prestored symbol sequences corresponding to the accessed prestored message, and the indicator activation means activates an indicator for each of the plurality of keys determined to correspond to each of the first symbols which begin at least one of the symbol sequences corresponding to the accessed prestored message to thereby define a limited number of first symbol keys for subsequent activation.

75. The predictive scanning input system of claim 74, wherein the detecting means further detects activation of one of the defined limited number of first symbol keys and detects the first symbol corresponding to the activated key, the determination means compares the detected first symbol to the plurality of symbol sequences stored in said memory means which correspond to the accessed prestored message, determines which of the plurality of symbol sequences begin with the detected first symbol, determines second symbols as being symbols immediately following the detected first symbol in symbol sequences beginning with the detected first symbol, and determines which of said plurality of keys correspond to the second symbol, and the indicator activation means activates an indicator for each of the plurality of keys determined to correspond to each of said second symbols to thereby define a limited number of second symbol keys for subsequent activation.

76. The predictive scanning input system of claim 75, wherein the detection means further detects subsequent activation of one of the defined limited number of second symbol keys and detects the second symbol corresponding to the subsequently activated key, the determination means compares the detected second symbol to the plurality of symbol sequences which correspond to the accessed prestored message and sequentially contain the previously detected first symbol, determines which of the plurality of symbol sequences contain the detected second symbol as a next sequential symbol, determines third symbols as being symbols of those symbol sequences containing the detected second symbol as a next sequential symbol which immediately follow the detected second symbol, and determines which of the plurality of keys correspond to each third symbol, and the indicator activator means activate an indicator for each of the plurality of keys determined to correspond to each of the third symbols to thereby define a limited number of third symbol keys for subsequent activation.

77. The predictive scanning input system of claim 76, wherein the determination means compares each detected symbol to the plurality of symbol sequences which correspond to the accessed prestored message and sequentially contain each of the previously detected symbols, and, upon determining that a detected symbol ends a symbol sequence, the determination means accesses the memory means for a subsequent corrersponding prestored message, which is inserted into the previously accessed prestored message and forms a combined message.

47

78. The predictive scanning input system of claim 77, further comprising:

output means, operatively connected to the determination means and the memory means, for outputting the combined message.

79. The system of claim 74, wherein said indicator activation means includes:

means for sequentially and alternatingly accessing each of a plurality of keys, arranged in parallel rows in a first direction and in parallel columns in a second direction perpendicular to the first direction, on said keyboard, to which said indicators correspond, and thereby sequentially activating each of said indicators for said plurality of keys determined to correspond to each of said first symbols of the accessed prestored message.

80. The system of claim 79, further comprising:

input means for activating one of said accessed keys corresponding to one of an activated indicator, to thereby allow further predictive scanning.

81. The predictive scanning input system of claim 79, wherein the detection means further detects subsequent activation of one of the defined limited number of first symbol keys and detects the first symbol corresponding to the subsequently activated key, the determination means compares the detected first symbol to the plurality of symbol sequences which correspond to the accessed prestored message, determines which of the plurality of symbol sequences begin with the detected first symbol, determines second symbols as being symbols of those symbol sequences beginning with the detected first symbol as a next symbol immediately following the detected first symbol, and determines which of the plurality of keys correspond to each second symbol, and the indicator activator means activates an indicator for each of the plurality of keys determined to correspond to each of the second symbols in a row-column sequential manner to thereby define a limited number of second symbol keys for subsequent activation.

82. The predictive scanning input system of claim 81, wherein the determination means compares a detected second symbol to the plurality of symbol sequences which correspond to the accessed prestored message and sequentially contain the previously detected first symbol, and upon determining that the detected second symbol ends a symbol sequence, the determination means accesses the memory means for a subsequent corresponding prestored message, which is inserted into the previously accessed prestored message and forms a combine message.

83. The predictive scanning input system of claim 82, further comprising:

output means, operatively connected to the determination means and the memory means for outputting the complete message.

84. The system of claim 74, wherein each said indicator includes at least one of an audible indicator and a visual indicator.

85. The system of claim 83, wherein each said indicator includes at least one of an audible indicator and a visual indicator.

86. The method of claim 51, wherein step (k) further comprises the substeps of:

48

(i) accessing a corresponding prestored message upon determining that the most recently detected symbol ends a symbol sequence;

(ii) determining which symbols are first symbols which begin at least one of a plurality of prestored symbol sequences corresponding to the accessed prestored message;

(iii) determining which of the plurality of keys correspond to each of the first symbols which begin at least one of the plurality of prestored symbol sequences corresponding to the accessed prestored message; and (iv) activating an indicator for each of the plurality of keys determined to correspond to the first symbols which begin at least one of the symbol sequences corresponding to the accessed prestored message to thereby define a limited number of first symbol keys for subsequent activation.

87. The method of claim 86, wherein step (k) further comprises the substeps of:

(v) detecting activation of one of the limited number of first symbol keys and detecting the first symbol corresponding to the activated key;

(vi) comparing the detected first symbol to the plurality of stored symbol sequences which correspond to the accessed prestored message, determining which of the plurality of symbol sequences begin with the detected first symbol, determining second symbols as being symbols immediately following the detected symbol in symbol sequences beginning with the detected first symbol, and determining which of the plurality of keys correspond to each second symbol; and (vii) activating an indicator for each of the plurality of keys determined to correspond to each of the second symbols to thereby define a limited number of second symbol keys for subsequent activation.

88. The method of claim 87, wherein step (k) further comprises the substeps of:

(viii) detecting subsequent activation of one of the defined limited number of second symbol keys and detecting the second symbol corresponding to the subsequently activated keys;

(ix) comparing the detected second symbol to the plurality of symbol sequences which correspond to the accessed prestored message and sequentially contain the previously detected first symbol, determining which of the plurality of symbol sequences contain the detected second symbol as a next sequential symbol, determining the third symbols as being symbols of those symbol sequences containing the detected second symbol as a next sequential symbol which immediately follow the detected second symbol, and determining which of the plurality of keys correspond to each third symbol; and (x) activating an indicator for each of the plurality of keys determined to correspond to each of the third symbols to thereby define a limited number of third symbol keys for subsequent activation.

89. The method of claim 88, wherein step (k) further comprises the substeps of:

(xi) repeating steps (viii)–(x) until a next sequential symbol cannot be determined in step (ix) for any stored symbol sequence, thereby determining that the most recently detected symbol ends a symbol sequence corresponding to the accessed prestored message;

(xii) accessing a prestored submessage corresponding to the symbol sequence containing the detected symbol as an end symbol in a symbol sequence; and (xiii) combining the accessed prestored submessage with the previously accessed message to form a combined message.

90. The method of claim 89, wherein, in step (l), the combined message is output.

91. The method of claim 86, wherein step (iv) occurs by sequential and alternate accessing of a plurality of keys, arranged in parallel rows in a first direction and a in parallel columns in a second direction perpendicular to the first direction, of the keyboard to which said indicators correspond, and thereby sequentially row-column activating each of the indicators for each of the plurality of keys corresponding to the first symbols determined to begin at least one of the plurality of symbol sequences of the accessed prestored message.

92. The method of claim 87, wherein step (vii) by sequential and alternate accessing of a plurality of keys, arranged in parallel rows in a first direction and in parallel columns in a second direction perpendicular to the first direction, of the keyboard, to which said indicators correspond, and thereby sequentially row-column activating each of the indicators for each of the plurality of keys corresponding to each of the second symbols.

93. The method of claim 89, wherein step (xi) occurs by sequential and alternate accessing of a plurality of keys, arranged in parallel rows in a first direction and in parallel columns in a second direction perpendicular to the first direction, of the keyboard, to which said indicators correspond, and thereby sequentially row-column activating each of the indicators for each of the plurality of keys corresponding to each of the third symbols.

94. The method of claim 86, wherein at least one of an audible and a visual indicator is activated in step (iv).

95. The method of claim 89, wherein at least one of an audible and a visual indicator is activated in each of steps (vii), (x), and (xi).

96. The method of claim 91, wherein at least one of an audible and a visual indicator is activated in step (iv).

97. The method of claim 92, wherein at least one of an audible and a visual indicator is activated in step (vii).

98. The method of claim 93, wherein at least one of an audible and a visual indicator is activated in step (xi).

99. A predictive scanning input system for predictive selection of keys on a keyboard, comprising:

input means for selecting a key and for simulating activation of the key upon maintaining selection for a first predetermined period of time;

detecting means for detecting simulated activation of the key and for detecting a first element corresponding to said simulated activated key;

memory means for storing a plurality of sequences, each including a plurality of elements, each element corresponding to one of a plurality of keys on the keyboard;

comparison means, operatively connected to said detecting means and said memory means, for comparing the detected first element to said plurality of sequences stored in said memory means, determining which of said plurality of sequences begin with said detected first element, determining second elements as being elements of those sequences beginning with the detected first element which immediately follow the detected first element, and determining which of said plurality of keys correspond to each second element; and indicator activation means, operatively connected to said comparison means, for activating an indicator for each of said plurality of keys determined to correspond to each of said second elements to thereby define a limited number of second element keys for subsequent simulated activation.

100. The system of claim 99, wherein:

the input means subsequently selects one of the defined limited number of second element keys, the detecting means detects a selected key upon the input means maintaining selection of a key for the first predetermined period of time, the determining means determines if the selected key is one of the defined limited number of second element keys;

the detecting means detects simulated activation of one of the defined limited number of second element keys and detects the second element corresponding to the simulated activated key upon the selected key being determined to be one of the defined limited number of second element keys;

the determining means determines a keyboard location of the selected key upon the selected key failing to be determined to be one of the defined limited number of second element keys;

the determining means determines which of the defined limited number of second element keys is in closest proximity to the determined keyboard location, and the detecting means detects simulated activation of the determined closest proximate second element key and detects the second element corresponding to the simulated activated key.

101. The system of claim 100, wherein the elements are symbols.

102. The system of claim 101, wherein the plurality of symbols on the keys include polymeric icons.

103. The predictive scanning input system of claim 100, wherein the comparison means compares the detected second element to the plurality of sequences sequentially containing the previously detected first element, determines which of the plurality of sequences contain the detected second element as a next sequential element, determines third elements as being elements of those sequences containing the detected second element as a next sequential element which immediately follow the detected second element, and determines which of the plurality of keys correspond to each third element, and the indicator activator means activates an indicator for each of the plurality of keys determined to correspond to each of the third elements to thereby define a limited number of third element keys for subsequent activation.

104. The predictive scanning input system of claim 103, wherein the comparison means, compares each detected element to the plurality of sequences sequentially containing each of the previously detected elements, and upon determining that a detected element ends a sequence, the comparison means accesses the sequence.

105. The predictive scanning input system of claim 104 further comprising:

output means, operatively connected to the comparison means and the memory means, for outputting a prestored message corresponding to the accessed sequence.

106. A method of predictive input scanning for predictive selection of keys on a keyboard, comprising the steps of:
   (a) selecting a key and simulating activation of the key upon maintaining selection for a first predetermined period of time;
   (b) detecting simulated activation of the key and detecting a first element corresponding to the simulated activated key;
   (c) storing a plurality of sequences, each including a plurality of elements, each element corresponding to one of a plurality of keys on the keyboard;
   (d) determining which of the plurality of stored sequences begin with the detected first element, determining second elements as being elements of at least one of the plurality of stored sequences beginning with the detected first element which immediately follow the detected first element, and determining which of the plurality of keys correspond to each second element; and
   (e) activating an indicator for each of the plurality of keys determined to correspond to each of the second elements to thereby define a limited number of second element keys for subsequent simulated activation.

107. The method of claim 106, further comprising the steps of:
   (f) selecting a key and eventually simulating activation of one of the defined limited number of second element keys with an input device;
   (g) detecting a selected key upon the input device maintaining selection of a key for the first predetermined period of time;
   (h) determining if the selected key is one of the defined limited number of second element keys;
   (i) detecting simulated activation of one of the defined limited number of second element keys and detecting the second element corresponding to the simulated activated key upon the selected key being determined to be one of the defined limited number of second element keys;
   (j) determining a keyboard location of the selected key upon the selected key failing to be determined to be one of the defined limited number of second element keys;
   (k) determining which of the defined limited number of second element keys is in closest proximity to the determined keyboard location; and
   (l) detecting simulated activation of the determined closest proximate second element key and detecting the second element corresponding to the simulated activated key.

108. The method of claim 107, further comprising the steps of:
   (m) comparing the detected second element to the plurality of sequences sequentially containing the previously detected first element, determining which of the plurality of sequences contain the detected second element as a next sequential element, determining third elements as being elements of those sequences containing the detected second element as a next sequential element which immediately follow the detected second element, and determining which of the plurality of keys correspond to each third element; and
   (n) activating an indicator for each of the plurality of keys determined to correspond to each of the third elements to thereby define a limited number of third element keys for subsequent simulated activation.

109. The method of claim 108, further comprising the steps of:
   (o) repeating steps (f)–(n), until a next immediately following element cannot be determined in step (m) for any stored sequence, thereby determining that the most recently detected element ends a sequence; and
   (p) outputting a prestored message corresponding to the stored sequence which contains the most recently detected element as an end element in a stored sequence.

110. The method of claim 106, wherein at least one of an audible and a visual indicator is activated in step (e).

111. The method of claim 109, wherein at least one of an audible and a visual indicator is activated in each of steps (n) and (o).

112. The system of claim 100, wherein the input means, upon selecting a key which is a non-defined key and maintaining selection of the key for at least a second predetermined period of time, greater than the first predetermined period of time, simulates activation of the non-defined key, and the detecting means detects simulated activation of the non-defined key and detects an element corresponding to the simulated activated key.

113. The system of claim 100, wherein the detecting means, upon the selected key failing to be determined to be one of the defined limited number of second element keys, detects if the selection of the key has been maintained for at least a second predetermined period of time greater than the first predetermined period of time, and upon detecting that the selection of the key has been maintained for at least the second predetermined period of time, the detecting means detects simulated activation of the non-defined key and detects an element corresponding to the simulated activated key.

114. The system of claim 100, wherein subsequent simulated activation of one of the defined limited number of second element keys is easier than subsequent simulated activation of a non-defined key.

115. The method of claim 107, wherein
   upon selecting a key which is a non-defined key in step (f) and maintaining selection of the key for at least a second predetermined period of time, greater than the first predetermined period of time, simulating activation of the non-defined key, and
   detecting the simulated activation of the non-defined key and detecting an element corresponding to the simulated activated key in step (f).

116. The method of claim 107, wherein, upon the selected key failing to be determined to be one of the defined limited number of second element keys in step (i), detecting if the selection of the key has been maintained for at least a second predetermined period of time, greater than the first predetermined period of time, and upon detecting that the selection of the key has been maintained for at least the second predetermined period of time, detecting simulated activation of the non-defined key and detecting an element corresponding to the simulated activated key.

117. The method of claim 107, wherein activation of one of the defined limited number of second element keys is easier than subsequent simulated activation of a non-defined key.

* * * * *